(12) United States Patent
Tanaka et al.

(10) Patent No.: US 11,492,485 B2
(45) Date of Patent: Nov. 8, 2022

(54) RESIN COMPOSITION AND METHOD FOR DETERMINING FLAME RETARDANCY OF RESIN COMPOSITION

(71) Applicant: THE DOSHISHA, Kyoto (JP)

(72) Inventors: Tatsuya Tanaka, Kyoto (JP); Yukinori Sano, Kyoto (JP); Kenta Masuyama, Kyoto (JP)

(73) Assignee: THE DOSHISHA, Kyoto (JP)

( * ) Notice: Subject to any disclaimer, the term of this patent is extended or adjusted under 35 U.S.C. 154(b) by 128 days.

(21) Appl. No.: 16/497,506

(22) PCT Filed: Mar. 26, 2018

(86) PCT No.: PCT/JP2018/012149
§ 371 (c)(1),
(2) Date: Dec. 6, 2019

(87) PCT Pub. No.: WO2018/181185
PCT Pub. Date: Oct. 4, 2018

(65) Prior Publication Data
US 2020/0385567 A1    Dec. 10, 2020

(30) Foreign Application Priority Data

Mar. 27, 2017 (JP) .............................. JP2017-060959

(51) Int. Cl.
C08L 67/04 (2006.01)
C08L 1/02 (2006.01)

(52) U.S. Cl.
CPC .................. C08L 67/04 (2013.01); C08L 1/02 (2013.01)

(58) Field of Classification Search
CPC ......... C08K 5/521; C08L 23/12; C08L 67/04; C08L 1/02
See application file for complete search history.

(56) References Cited

U.S. PATENT DOCUMENTS

| | | | | |
|---|---|---|---|---|
| 9,334,390 B2* | 5/2016 | Kawashima | .............. | C08L 1/02 |
| 2007/0270527 A1* | 11/2007 | Horie | ........................ | C08L 3/06 |
| | | | | 524/77 |
| 2008/0262151 A1 | 10/2008 | Ishii et al. | | |
| 2011/0130487 A1* | 6/2011 | Noh | ........................ | C08L 23/12 |
| | | | | 524/35 |
| 2011/0130488 A1* | 6/2011 | Yoshino | ................ | C08L 101/16 |
| | | | | 524/35 |
| 2014/0076196 A1* | 3/2014 | Kawashima | ............ | C08L 67/04 |
| | | | | 106/203.1 |
| 2015/0368442 A1* | 12/2015 | Soyama | .................. | C08L 1/08 |
| | | | | 524/41 |

FOREIGN PATENT DOCUMENTS

| | | |
|---|---|---|
| JP | 56-116701 | 9/1981 |
| JP | 2006-111858 | 4/2006 |
| JP | 2008-150492 | 7/2008 |
| JP | 2011-153296 | 8/2011 |
| JP | 2012-162681 | 8/2012 |
| JP | 2014-133835 | 7/2014 |

OTHER PUBLICATIONS

Qui et al. (Polymer Composites, 2005, 448-453) (Year: 2005).*
Machine Translation of JP 2011-153296, 2021 (Year: 2021).*
Shumao et al. (Polym Int 2010; 59: 242-248) (Year: 2010).*
Extended European Search Report dated Jan. 12, 2021 in corresponding European Patent Application No. 18775609.3.
Sun Lichao et al., "Thermal decomposition of fire-retarded wood flour/polypropylene composites", Journal of Thermal Analysis and Calorimetry, 2015, vol. 123, No. 1, pp. 309-318.
Li Liping et al., "Synergistic effect of melamine polyphosphate and aluminum hypophosphite on mechanical properties and flame retardancy of HDPE/wood flour composites", Wood Science and Technology, 2016, vol. 51, No. 3, pp. 493-506.
Costes Lucie et al., "Cellulose/phosphoms combinations for sustainable fire retarded polylactide", European Polymer Journal, 2015, vol. 74, pp. 218-228.

(Continued)

*Primary Examiner* — Liam J Heincer
(74) *Attorney, Agent, or Firm* — Wenderoth, Lind & Ponack, L.L.P.

(57) ABSTRACT

There are provided a resin composition that is suitable for the production of a flame-retardant molded article and that can provide high flame retardancy even with a small amount of flame retardant added, and a flame retardancy determination method for determining the flame retardancy of a resin composition. The resin composition of the present invention contains a thermoplastic resin, a cellulosic material, and a phosphate flame retardant and satisfies relational expressions (1) and (2) (where in expressions (1) and (2), $T_P$, $T_B$, and $T_{CMP}$ are temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition. When the resin composition has two weight loss rate peaks, $T_{CMP}$ is a temperature at a peak on a lower temperature side).

15 Claims, 16 Drawing Sheets

(56) References Cited

OTHER PUBLICATIONS

International Search Report dated Jun. 26, 2018 in International (PCT) Application No. PCT/JP2018/012149.
Anna et al., "Surface Treated Cellulose Fibres in Flame Retarded PP Composites", Macromol. Symp., 2003, vol. 202, pp. 245-254.
International Preliminary Report on Patentability dated Jun. 26, 2019 in International (PCT) Application No. PCT/JP2018/012149, with English translation.

* cited by examiner

RESIN COMPOSITION AND METHOD FOR DETERMINING FLAME RETARDANCY OF RESIN COMPOSITION

TECHNICAL FIELD

The present invention relates to a resin composition suitable for the production of a flame-retardant molded article and a flame retardancy determination method for determining the flame retardancy of a resin composition.

BACKGROUND ART

In recent years, organic materials such as plastics have been used in a wide variety of fields such as home appliances, automobiles, and building materials.

However, organic materials often suffer from flammability and combustibility. Specifically, when organic materials are used for, for example, electrical equipment or automotive parts, organic materials may cause fire or combustion spreading, depending on usage environment or the like.

It is known that flame retardants are added to plastics to improve the flame retardancy of plastics.

Patent Literature 1 discloses a resin composition containing a thermoplastic resin, a wood material powder, and a compatibilizer and an example in which a phosphate-based flame retardant is added as a flame retardant.

CITATION LIST

Patent Literature

PTL 1: Japanese Unexamined Patent Application Publication No. 2014-133835

SUMMARY OF INVENTION

Technical Problem

The addition of a large amount of flame retardant in order to obtain high flame retardancy causes deterioration in mechanical properties and an increase in cost.

It is thus desirable to provide high flame retardancy while the amount of flame retardant added is reduced.

The present invention aims to provide a resin composition that is suitable for the production of a flame-retardant molded article and that can provide high flame retardancy even with a small amount of flame retardant added and to provide a flame retardancy determination method for determining the flame retardancy of a resin composition.

Solution to Problem

The inventors have conducted intensive studies to solve the foregoing problems and have found that a non-combustible gas generated by the dehydration reaction of cellulose and char layer formation play an important role in providing flame retardancy, a phosphate-based flame retardant promotes the dehydration reaction of cellulose, and conditions for sufficiently providing such a synergistic effect. These findings have led to the completion of the present invention.

A resin composition according to the present invention contains a thermoplastic resin, a cellulosic material consisting only of cellulose, and a phosphate-based flame retardant, the resin composition satisfying relational expressions described below:

[Math. 1]
$$T_P - T_{CMP} \geq 95 \tag{1}$$

[Math. 2]
$$T_P > T_B \tag{2}$$

(where in expressions (1) and (2), $T_P$, $T_B$, and $T_{CMP}$ are temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition, wherein when the resin composition has two weight loss rate peaks, $T_{CMP}$ is a temperature at a peak on a lower temperature side).

A method for determining the flame retardancy of a resin composition according to the present invention includes determining the flame retardancy of a resin composition based on determination elements (1) and (2) described below, the resin composition containing a thermoplastic resin, a cellulosic material, and a phosphate-based flame retardant:

determination element (1): a difference between $T_P$ and $T_{CMP}$, and determination element (2): a magnitude relationship between $T_P$ and $T_B$, (in which in the determination elements (1) and (2), $T_P$, $T_B$, and $T_{CMP}$ indicate temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition, and in which when the resin composition has two weight loss rate peaks, $T_{CMP}$ is a temperature at a peak on a lower temperature side).

Advantageous Effects of Invention

The resin composition according to the present invention is suitable for the production of a flame retardant molded article and can provide high flame retardancy even with a small amount of flame retardant added.

In the method for determining the flame retardancy of a resin composition according to the present invention, the time for trial and error from kneading to combustion testing is not required, and the flame retardancy can be determined by simple thermogravimetric analysis.

DESCRIPTION OF EMBODIMENTS

Figure 1:
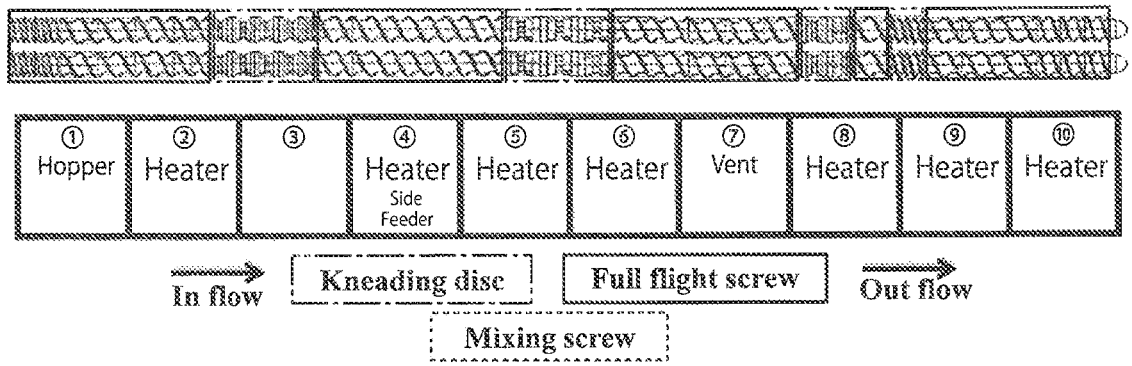
FIG. 1 is a diagram illustrating the configuration of a screw segment used to knead a polypropylene-based sample in an example.

Preferred embodiments of a resin composition and a method for determining the flame retardancy of a resin composition according to the present invention will be described in detail below.

However, the scope of the present invention is not limited to these explanations. Modifications other than the following examples can be appropriately made without departing from the spirit of the present invention.

The resin composition according to the present invention contains a thermoplastic resin, a cellulosic material, and a phosphate-based flame retardant.

Examples of the thermoplastic resin include, but are not limited to, polyolefins such as polypropylene and polyethylene, polyolefin copolymers, polyesters such as poly(lactic acid) and poly(ethylene terephthalate), poly(vinyl chloride), vinyl chloride copolymers, and acrylonitrile-butadiene-styrene copolymers. Polyolefin or polyester is preferred. Poly (lactic acid) is particularly preferred.

Examples of the cellulosic material include cellulose powders; materials, such as wood and wood flour obtained by grinding wood, containing a component (for example, lignin or hemicellulose) other than cellulose; and processed products such as pulp made of fibrous cellulose chips. A cellulose power is particularly preferred from the viewpoint of imparting flame retardancy.

Although the size of the cellulosic material is not particularly limited, the cellulosic material preferably has a particle size 150 μm or less. A particle size of more than 150 μm may cause problems with the mechanical properties such as the tensile strength of a molded article. The amount of the cellulosic material mixed is preferably, but not particularly limited to, 70% or less by weight. An amount of the cellulosic material mixed of more than 70% by weight may cause problems with moldability and the mechanical properties such as the tensile strength of a molded article.

Preferable examples of the phosphate-based flame retardant include, but are not limited to, ammonium polyphosphate and melamine phosphate.

The amount of the phosphate-based flame retardant mixed may be, but is not particularly limited to, for example, 5% to 15% by weight. An insufficient amount of the phosphate-based flame retardant mixed may lead to an insufficient flame retardant effect. An excessive amount of the phosphate-based flame retardant mixed may lead to a decrease in the mechanical properties of a molded article.

In the present invention, flame retardancy is imparted by the synergistic effect of the cellulosic material and the phosphate-based flame retardant; thus, sufficient flame retardancy can be provided even at a small amount of the flame retardant mixed.

The resin composition according to the present invention may contain another component in addition to the components as long as the effect of the present invention is not impaired.

An example of the another component is a compatibilizer.

The compatibilizer may be appropriately determined in accordance with the thermoplastic resin used as a matrix resin. For example, in the case of polypropylene, an example thereof is maleic anhydride-modified polypropylene.

The amount of the compatibilizer added is appropriately determined in accordance with the thermoplastic resin and is preferably, but not particularly limited to, 1/20 or more, more preferably 1/17 to 1/15 of the cellulosic material by weight in order to ensure the mechanical properties such as tensile strength of a molded article to be obtained.

The resin composition according to the present invention satisfies relational expressions described below.

[Math. 3]

$$T_P - T_{CMP} \geq 95 \quad (1)$$

[Math. 4]

$$T_P > T_B \quad (2)$$

In the relational expressions (1) and (2), $T_P$, $T_B$, and $T_{CMP}$ indicate temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition.

When the resin composition has two weight loss rate peaks, $T_{CMP}$ is a temperature at a peak on a lower temperature side.

$T_P$, $T_B$, and $T_{CMP}$ can be measured by known differential thermogravimetric analysis (DTG).

While moldability and the mechanical properties of a molded article are taken into consideration, the types, amounts, and so forth of the components in the resin composition according to the present invention may be appropriately selected in such a manner that the relational expressions are satisfied.

A method for determining the flame retardancy of a resin composition according to the present invention is one in which the flame retardancy of a resin composition containing a thermoplastic resin, a cellulosic material, and a phosphate-based flame retardant is determined on the basis of determination elements (1) and (2):

determination element (1): a difference between $T_P$ and $T_{CMP}$, and determination element (2): a magnitude relationship between $T_P$ and $T_B$.

The descriptions of components, the definitions of $T_P$, $T_B$, and $T_{CMP}$, and so forth overlap those in the resin composition according to the present invention; thus, explanations thereof are omitted.

EXAMPLES

While a resin composition and a method for determining the flame retardancy of a resin composition according to the present invention will be described below by examples and comparative examples, the present invention is not limited to these examples.

[Production of Polypropylene-Based Sample]

Example 1

A thermoplastic resin, a cellulosic material, a phosphate-based flame retardant, and a compatibilizer were kneaded to prepare a resin composition.

As the thermoplastic resin, polypropylene (J108M, hereinafter abbreviated as "PP", available from Prime Polymer Co., Ltd.) was used.

As the cellulosic material, a cellulose powder (KC Flock W-100GK, hereinafter abbreviated as "CP", available from Nippon Paper Industries Co., Ltd.) was used.

As the phosphate-based flame retardant, ammonium polyphosphate (Taien K, hereinafter abbreviated as "APP", available from Taihei Chemical Industrial Co., Ltd.) was used.

As the compatibilizer, maleic anhydride-modified polypropylene (Umex 1001, hereinafter abbreviated as "MAPP", available from Sanyo Chemical Industries, Ltd.) was used.

The amounts mixed were as follows: PP, 36.7% by weight; CP, 50% by weight; APP, 10% by weight; and MAPP, 3.3% by weight.

A single-stage kneading process was performed for the kneading with a unidirectionally rotating twin-screw extruder "ZSK 18" (available from Coperion GmbH, screw diameter=18 mm, L/D=40).

FIG. 1 illustrates the configuration of a screw segment. The screw configuration was such that a shear force was applied to a sample during kneading, as described below. Kneading disks to plasticize the thermoplastic resin were arranged in one place. To improve the diffusibility of the cellulosic material, kneading disks were arranged in two places, and mixing screws were arranged in one place.

The cellulosic material and the phosphate-based flame retardant were dried with hot air in a hot-air dryer (forced circulation incubator Soyokaze, available from Isuzu Seisakusho, the same applies hereinafter) at 80° C. for 24 hours.

The table below presents kneading conditions. The circled numbers correspond to the positional relationship in FIG. 1.

TABLE 1

| | Rotational speed of screw (rpm) | | | | | | |
| --- | --- | --- | --- | --- | --- | --- | --- |
| | 150 | | | | | | |
| | ② | ④ | ⑤ | ⑥ | ⑧ | ⑨ | ⑩ |
| Set temperature of heater (° C.) | 170 | 170 | 140 | 140 | 140 | 140 | 175 |

Example 2, Reference Example 3, and Comparative Example 1 to 13

Resin compositions of Example 2, Reference Example 3, a kneaded resin material of Comparative example 1, and resin compositions of Comparative examples 2 to 13 were prepared as samples in the same manner as in Example 1, except that the materials or the amounts mixed were changed as presented in Table 2 below.

TABLE 2

| | Thermoplastic resin | Compatibilizer | Cellulosic material | | | Flame retardant |
|---|---|---|---|---|---|---|
| | PP | MAPP | CP | Pulp | BF | APP |
| Example 1 | 36.7 | 3.3 | 50 | — | — | 10 |
| Example 2 | 36.7 | 3.3 | — | 50 | — | 10 |
| Reference example 3 | 36.7 | 3.3 | — | — | 50 | 10 |
| Comparative example 1 | 100 | — | — | — | — | — |
| Comparative example 2 | 86.7 | 3.3 | — | — | — | 10 |
| Comparative example 3 | 86.7 | 3.3 | 10 | — | — | — |
| Comparative example 4 | 66.7 | 3.3 | 30 | — | — | — |
| Comparative example 5 | 46.7 | 3.3 | 50 | — | — | — |
| Comparative example 6 | 76.7 | 3.3 | 10 | — | — | 10 |
| Comparative example 7 | 56.7 | 3.3 | 30 | — | — | 10 |
| Comparative example 8 | 86.7 | 3.3 | — | 10 | — | — |
| Comparative example 9 | 66.7 | 3.3 | — | 30 | — | — |
| Comparative example 10 | 46.7 | 3.3 | — | 50 | — | — |
| Comparative example 11 | 76.7 | 3.3 | — | 10 | — | 10 |
| Comparative example 12 | 56.7 | 3.3 | — | 30 | — | 10 |
| Comparative example 13 | 46.7 | 3.3 | — | — | 50 | — |

Numerical values in Table 2 are given in units of % by weight.

In Table 2, Pulp represents pulp made of fibrous cellulose chips (Bleached *Eucalyptus* Kraft Pulp-Tres Lagoas mill, available from Fibria) (hereinafter, also abbreviated as "Pulp"). The Pulp used had an average fiber length of 1,657 μm.

In Table 2, BF represents bio-fillers (available from Plaisir Co. Ltd., from Shobara-shi, Hiroshima-ken) (hereinafter, also abbreviated as "BF"). BF is a wood powder containing lignin and hemicellulose in addition to a cellulose component.

For convenience of reference, the amounts mixed in Example 1 were also described in Table 2.

[Production of Poly(Lactic Acid)-Based Sample]

Example 4

A thermoplastic resin, a cellulosic material, and a phosphate-based flame retardant were kneaded to prepare a resin composition.

As the thermoplastic resin, poly(lactic acid) (REVODE 110, hereinafter abbreviated as "PLA", Zhejiang Hisun Biomaterials Co., Ltd.) was used.

As the cellulosic material, CP was used as in Example 1.

As the phosphate-based flame retardant, APP was used as in Example 1 was used.

The amounts mixed were as follows: PLA, 60% by weight; CP, 30% by weight; and APP, 10% by weight.

As with Example 1, the kneading was performed with a unidirectionally rotating twin-screw extruder "ZSK 18" (available from Coperion GmbH, screw diameter=18 mm, L/D=40).

A two-stage kneading process was used: PLA and CP were kneaded together to prepare a master batch. The resulting PLA/CP pellets were mixed well. The mixture was fed from a hopper.

Figure 2:
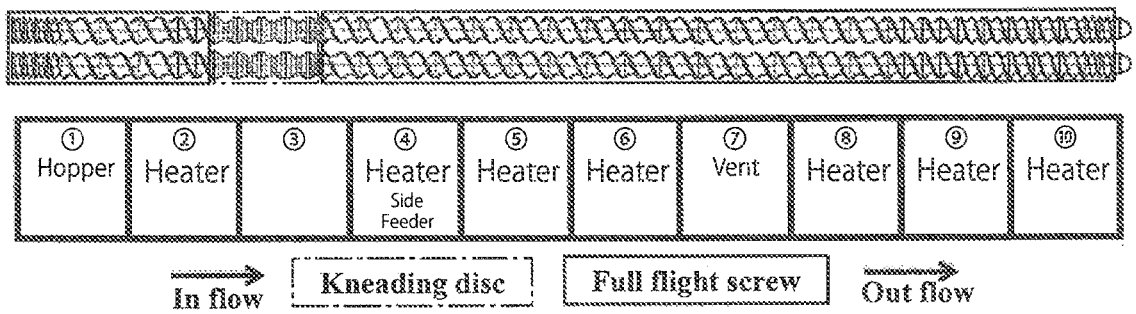
FIG. 2 is a diagram illustrating the configuration of a screw segment used to knead a poly(lactic acid)-based sample in an example.

FIG. 2 illustrates the configuration of a screw segment. The screw configuration was as follows: Kneading disks to plasticize the thermoplastic resin were arranged in one place. Screws arranged downstream thereof were all full flight screws. Temperature conditions and the screw configuration such that a sample was not heated during kneading were used.

Before kneading, PLA was vacuum-dried with a vacuum dryer (ADP 300, available from Yamato Scientific Co., Ltd.) at 90° C. for 3 hours, and CP and APP were dried with hot air in a hot-air dryer at 80° C. for 24 hours.

Table 3 below presents kneading conditions. The circled numbers correspond to the positional relationship in FIG. 2.

TABLE 3

| | Rotational speed of screw (rpm) | | | | | | |
|---|---|---|---|---|---|---|---|
| | 150 | | | | | | |
| | ② | ④ | ⑤ | ⑥ | ⑧ | ⑨ | ⑩ |
| Set temperature of heater (° C.) | 165 | 165 | 140 | 140 | 140 | 140 | 180 |

Example 5 and Comparative Examples 14 to 19

Kneaded resin materials of Example 5 and Comparative example 14 and resin compositions of Comparative examples 15 to 19 were prepared as samples in the same manner as Example 4, except that the materials or the amounts mixed were changed as presented in Table 4 below.

TABLE 4

|  | Thermoplastic resin PLA | Cellulosic material CP | Flame retardant APP |
|---|---|---|---|
| Example 4 | 60 | 30 | 10 |
| Example 5 | 50 | 40 | 10 |
| Comparative example 14 | 100 | — | — |
| Comparative example 15 | 90 | — | 10 |
| Comparative example 16 | 90 | 10 | — |
| Comparative example 17 | 70 | 30 | — |
| Comparative example 18 | 60 | 40 | — |
| Comparative example 19 | 80 | 10 | 10 |

Numerical values in Table 4 are given in units of % by weight.

For convenience of reference, the amounts mixed in Example 4 were also described in Table 4.

[Test]

<Production of Test Piece>

Figure 3:
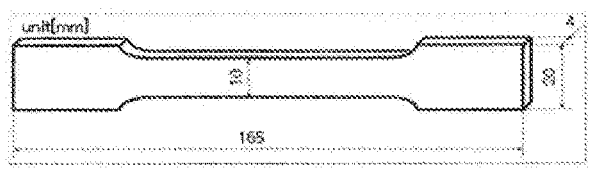
FIG. 3 is a diagram illustrating a dumbbell-shaped test piece produced in an example.

Dumbbell-shaped test pieces, illustrated in FIG. 3, for sample evaluation were produced from the samples (pellets produced with the twin-screw extruders) according to the examples and the comparative examples described above with an injection molding machine (PLASTRET-40V, available from Toyo Machinery & Metal Co., Ltd).

Figure 4:
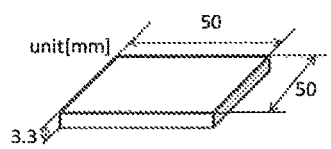
FIG. 4 is a diagram illustrating a plate-shaped test piece produced in an example.

Similarly, plate-shaped test pieces, as illustrated in FIG. 4, were produced from the samples according to the examples and the comparative examples described above.

Table 5 presents injection molding conditions for the dumbbell-shaped test pieces. Table 6 presents injection molding conditions for the plate-shaped test pieces.

"PP base" and "PLA base" correspond to the samples produced in "Production of Polypropylene-Based Sample" and the samples produced in "Production of Poly(Lactic Acid)-Based Sample", respectively.

Injection molding was performed after the samples (pellets) were dried with hot air in the hot-air dryer at 80° C. for 24 hours.

TABLE 5

|  | PP base | PLA base |
|---|---|---|
| Injection pressure (MPa) | 150 | 150 |
| Back pressure (MPa) | 9 | 4 |
| Holding Pressure (MPa) | 30 | 70 |
| Cylinder temperature (° C.) | 175 | 165 |
| Mold temperature (° C.) | 60 | 40 |
| Screw rotation speed (rpm) | 150 | 100 |
| Injection speed (mm/sec) | 50 | 20-50 |
| Holding time (sec) | 10 | 30 |
| Cooling time (sec) | 15 | 60 |

TABLE 6

|  | PP base | PLA base |
|---|---|---|
| Injection pressure (MPa) | 150 | 100 |
| Back pressure (MPa) | 2.7 | 4 |
| Holding Pressure (MPa) | 40 | 25 |

TABLE 6-continued

|  | PP base | PLA base |
|---|---|---|
| Cylinder temperature (° C.) | 175-200 | 165-180 |
| Mold temperature (° C.) | 60 | 40 |
| Screw rotation speed (rpm) | 50 | 100 |
| Injection speed (mm/sec) | 50 | 20-50 |
| Holding time (sec) | 10 | 8 |
| Cooling time (sec) | 10 | 120 |

<Test Method>

(1) Burning Test (1-1) Horizontal Burning Test

An end of each of the dumbbell-shaped test pieces produced in "Production of Test Piece" was cut, and then a test was performed with reference to test conditions of UL 94 standard.

Dimensions of a portion to be burned were 80 mm long, 10 mm wide, and 4 mm thick.

Marked lines were placed at 20 mm and 80 mm from the free end of the test piece.

All the test pieces were dried with hot air at 80° C. for 24 hours before the test. The number of test pieces was five for each sample.

Figure 5:
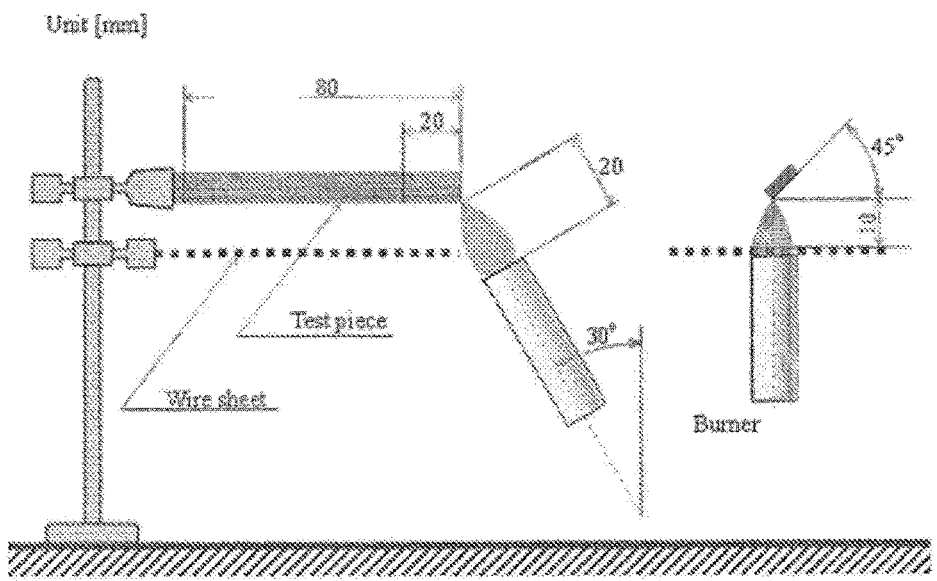
FIG. 5 is a diagram illustrating a method of a horizontal burning test in an example.

FIG. 5 illustrates a test apparatus. The length direction of the test piece was held horizontally, and the width direction thereof was held at an angle of 45° to the horizontal. A wire sheet to prevent the influence of dripping was installed at a position 10 mm from the lower end of the test piece. The wire sheet used had dimensions of 230 mm×130 mm. A gas torch burner using a combustible gas (R200 for RT-20/HC series, available from Sakae Seiki Co., Ltd.) as fuel was used for ignition. A stopwatch with a scale of 0.1 seconds was used.

(1-2) Vertical Burning Test

A vertical burning test was performed only for the samples having self-extinguishing properties in the horizontal burning test described in (1-1). The test was performed with reference to test conditions of UL 94 V-0 standard. The test pieces used in this experiment were the same as those used in the horizontal burning test. The number of test pieces was five for each sample.

Figure 6:
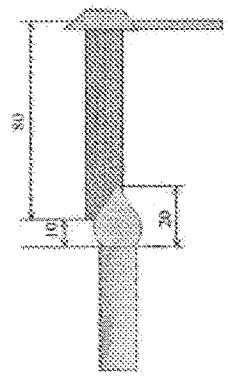
FIG. 6 is a diagram illustrating a method of a vertical burning test in an example.

FIG. 6 illustrates a test apparatus. The test piece was fixed vertically, and the test was performed using the same burner and stopwatch as in the horizontal burning test. The test method was as follows: In a room where the flow of air was not felt, the burner was ignited away from the test piece and adjusted to provide a stable blue flame with a flame height of about 20 mm. The central portion of the flame was brought into contact with the lower end of the test piece for 10 seconds at an angle of 20° to the length direction of the test piece. The combustion time was recorded. In the case where the combustion was stopped halfway, the flame was brought into contact with it for 10 seconds again, the combustion time was recorded, and the total combustion time was calculated.

(2) Cone Calorimeter

The calorific value and the heat release rate of each of the plate-shaped test pieces produced in the above section "Production of Test Piece" were measured with a cone calorimeter (Cone Calorimeter IIIC3, available from Toyo Seiki Seisakusho Co., Ltd). The test piece had dimensions of 50 mm×50 mm×3.3 mm. The distance between the lower end of the cone heater and the upper surface of the test piece was 25 mm. The heater temperature was 734.5° C. The amount of radiation was 50.0 W/m². The test piece was dried with hot air at 80° C. for 24 hours in a hot-air dryer before the test.

(3) Measurement of Formation Rate and Thickness of Char Layer

The dumbbell-shaped test pieces produced in the above section "Production of Test Piece" were cut into test pieces having 4 mm×10 mm×10 mm.

Figure 7:
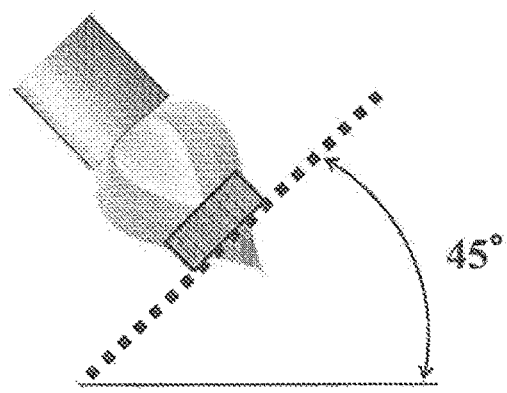
FIG. 7 is a diagram illustrating a method of a test for measuring the formation rate and the thickness of a char layer in an example.

Each test piece was burned using a gas torch burner as illustrated in FIG. 7. The test was performed using the same burner and stopwatch as those in the burning test. The burning time was increased in increments of 10 seconds: 10 seconds, 20 seconds, and 30 seconds. After burning, the test piece was submerged in water for rapid cooling. The test pieces were dried with hot air at 80° C. for 24 hours before the test.

The burned test piece was dried at 80° C. for 24 hours and cured with a resin (King Embedding Resin, additive for King Embedding resin only, a curing agent, and an accelerating agent, available from Sakamoto Koki Co., Ltd.) in order not to break the resulting char layer. After curing for 24 hours, the central portion of the test piece was cut with an electric saw. The upper portion of a cross section was photographed with a stereoscopic microscope (MT 9430, available from Meiji Techno Co., Ltd). The char layer of the photographed test piece was subjected to measurement at 120 points for each condition with computer software Sigma Pro Scan 5.

(4) Observation of Charred Material

The charred material after "(1) Burning Test" was observed with a scanning electron microscope (JSM 7001FD, available from JEOL Ltd., hereinafter abbreviated as "SEM"). Elemental analysis (hereinafter abbreviated as "EDS") was performed using SEM. Specifically, elemental analysis was performed for hydrogen, carbon, nitrogen, oxygen, and phosphorus. The observation was performed at an acceleration voltage of 20 kV.

(5) Thermogravimetric Analysis

The dumbbell-shaped test pieces produced in the above section "Production of Test Piece" were cut into chips, which were used as samples. Thermogravimetric analysis was performed with a differential calorimeter (DTG-50H, available from Shimadzu Corporation). An aluminum cell was used. The sample was used for the test in a weight of 10 to 11 mg. The test was performed in air. The temperature was increased to 600° C. at a rate of temperature increase of 10° C./min. The holding time was 0 hours. Then cooling was performed to 40° C. at −10° C./min.

<Test Results>

(1) Results of Burning Test

Tables 7 and 8 present the results of the horizontal and vertical burning tests.

TABLE 7

|  | PP | MAPP | CP | Pulp | BF | APP | Average burning rate (mm/min) | Class based on UL standard |
|---|---|---|---|---|---|---|---|---|
| Example 1 | 36.7 | 3.3 | 50 | — | — | 10 | self-extinguishing | V-0 |
| Example 2 | 36.7 | 3.3 | — | 50 | — | 10 | self-extinguishing | V-0 |
| Reference example 3 | 36.7 | 3.3 | — | — | 50 | 10 | self-extinguishing | V-0 |
| Comparative example 1 | 100 | — | — | — | — | — | 24.3 | HB |
| Comparative example 2 | 86.7 | 3.3 | — | — | — | 10 | 21.8 | HB |
| Comparative example 3 | 86.7 | 3.3 | 10 | — | — | — | 27.3 | HB |
| Comparative example 4 | 66.7 | 3.3 | 30 | — | — | — | 29.1 | HB |
| Comparative example 5 | 46.7 | 3.3 | 50 | — | — | — | 27.9 | HB |
| Comparative example 6 | 76.7 | 3.3 | 10 | — | — | 10 | 22.5 | HB |
| Comparative example 7 | 56.7 | 3.3 | 30 | — | — | 10 | 14.5 | HB |
| Comparative example 8 | 86.7 | 3.3 | — | 10 | — | — | 25.2 | HB |
| Comparative example 9 | 66.7 | 3.3 | — | 30 | — | — | 32.1 | HB |
| Comparative example 10 | 46.7 | 3.3 | — | 50 | — | — | 32.0 | HB |
| Comparative example 11 | 76.7 | 3.3 | — | 10 | — | 10 | 20.0 | HB |
| Comparative example 12 | 56.7 | 3.3 | — | 30 | — | 10 | 13.2 | HB |
| Comparative example 13 | 46.7 | 3.3 | — | — | 50 | — | 32.5 | HB |

TABLE 8

|  | PLA | CP | APP | Average burning rate (mm/min) | Class based on UL standard |
|---|---|---|---|---|---|
| Example 4 | 60 | 30 | 10 | self-extinguishing | V-0 |
| Example 5 | 50 | 40 | 10 | self-extinguishing | V-0 |
| Comparative example 14 | 100 | — | — | 23.0 | HB |
| Comparative example 15 | 90 | — | 10 | self-extinguishing | HB |
| Comparative example 16 | 90 | 10 | — | 25.3 | HB |
| Comparative example 17 | 70 | 30 | — | 28.7 | HB |
| Comparative example 18 | 60 | 40 | — | 25.0 | HB |
| Comparative example 19 | 80 | 10 | 10 | self-extinguishing | HB |

(2) Results of Cone Calorimeter

Tables 9 and 10 present the results with the cone calorimeter.

TABLE 9

|  | PP | MAPP | CP | Pulp | BF | APP | Maximum heat release rate (kW/m$^2$) | Total amount of heat released (MJ/m$^2$) | Average heat release rate (kW/m$^2$) | | | Total time |
|---|---|---|---|---|---|---|---|---|---|---|---|---|
|  |  |  |  |  |  |  |  |  | 60 s | 180 s | 300 s |  |
| Example 1 | 36.7 | 3.3 | 50 | — | — | 10 | 338.71 | 85.72 | 186.95 | 232.24 | 201.59 | 55.27 |
| Example 2 | 36.7 | 3.3 | — | 50 | — | 10 | 340.35 | 96.37 | 183.89 | 224.17 | 226.34 | 52.94 |
| Reference example 3 | 36.7 | 3.3 | — | — | 50 | 10 | 329.69 | 90.52 | 224.55 | 253.19 | 222.41 | 58.97 |
| Comparative example 1 | 100 | — | — | — | — | — | 1934.91 | 118.69 | 655.08 | 652.46 | 393.83 | 243.35 |
| Comparative example 2 | 86.7 | 3.3 | — | — | — | 10 | 810.01 | 110.77 | 435.56 | 604.51 | 365.92 | 180.53 |
| Comparative example 5 | 46.7 | 3.3 | 50 | — | — | — | 635.61 | 97.79 | 467.53 | 493.43 | 315.63 | 155.86 |
| Comparative example 10 | 46.7 | 3.3 | — | 50 | — | — | 693.21 | 97.31 | 431.26 | 500.12 | 316.82 | 155.14 |
| Comparative example 13 | 46.7 | 3.3 | — | — | 50 | — | 577.38 | 100.09 | 435.42 | 456.26 | 295.57 | 90.41 |

TABLE 10

|  | PLA | CP | APP | Maximum heat release rate (kW/m$^2$) | Total amount of heat released (MJ/m$^2$) | Average heat release rate (kW/m$^2$) | | | Total time |
|---|---|---|---|---|---|---|---|---|---|
|  |  |  |  |  |  | 60 s | 180 s | 300 s |  |
| Example 5 | 50 | 40 | 10 | 194.22 | 67.94 | 171.93 | 163.05 | 134.53 | 37.17 |
| Comparative example 14 | 100 | — | — | 870.11 | 67.65 | 549.10 | 371.55 | 223.45 | 183.70 |
| Comparative example 15 | 90 | — | 10 | 667.66 | 63.52 | 381.76 | 338.74 | 206.59 | 87.96 |
| Comparative example 18 | 60 | 40 | — | 466.49 | 71.99 | 344.81 | 347.25 | 222.21 | 78.96 |

Figure 8:
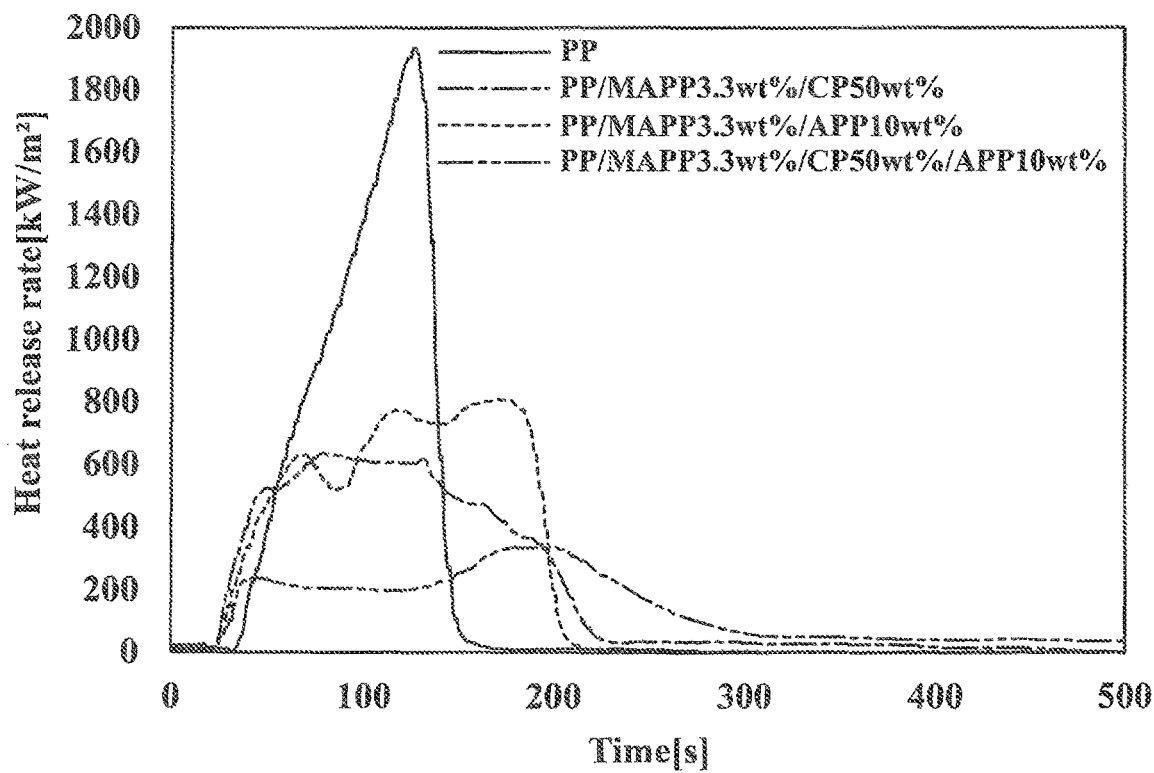
FIG. 8 is a graph illustrating the relationships between the heat release rates and the temperature of samples in examples.

FIG. 8 illustrates the relationships between the heat release rates and the temperature of the samples in:

Example 1 (PP/MAPP, 3.3 wt %/CP, 50 wt %/APP, 10 wt %),

Comparative example 1 (PP),

Comparative example 2 (PP/MAPP, 3.3 wt %/APP, 10 wt %), and

Comparative example 5 (PP/MAPP, 3.3 wt %/CP, 50 wt %).

Figure 9:
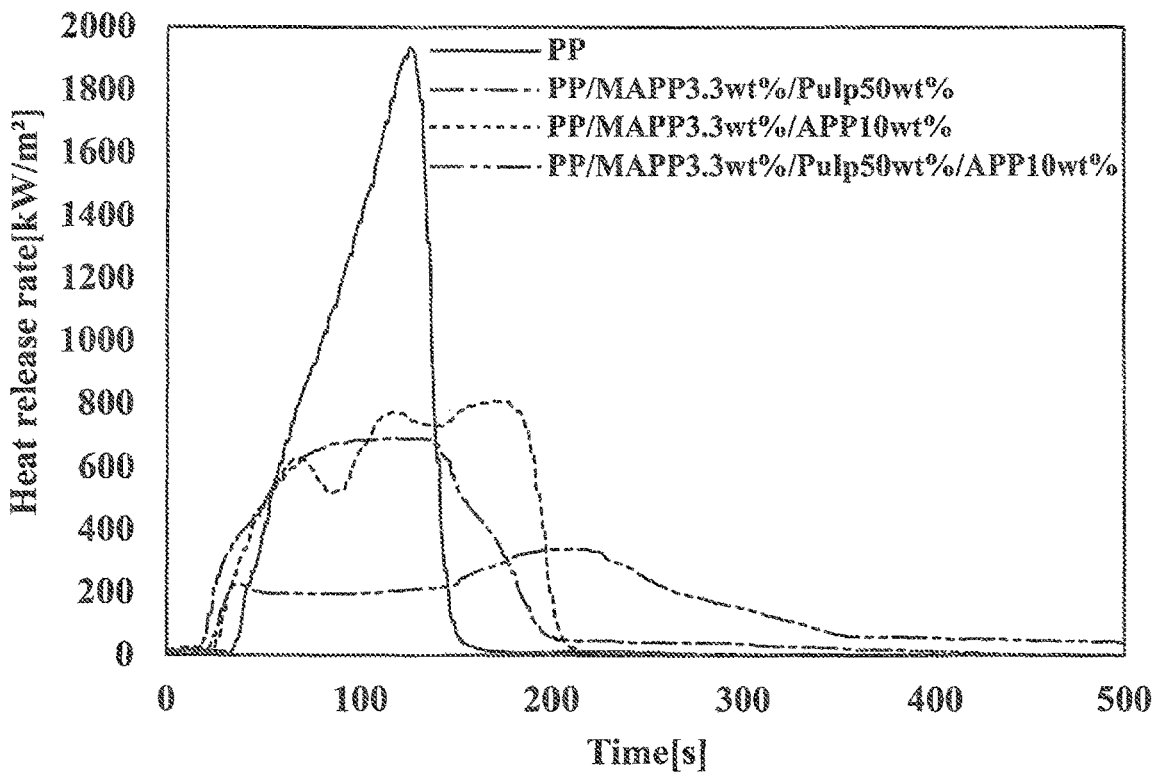
FIG. 9 is a graph illustrating the relationships between the heat release rates and the temperature of samples in examples.

FIG. 9 illustrates the relationships between the heat release rates and the temperature of the samples in:

Example 2 (PP/MAPP, 3.3 wt %/Pulp, 50 wt %/APP, 10 wt %),

Comparative example 1 (PP),

Comparative example 2 (PP/MAPP, 3.3 wt %/APP, 10 wt %), and

Comparative example 10 (PP/MAPP, 3.3 wt %/Pulp, 50 wt %)

Figure 10:
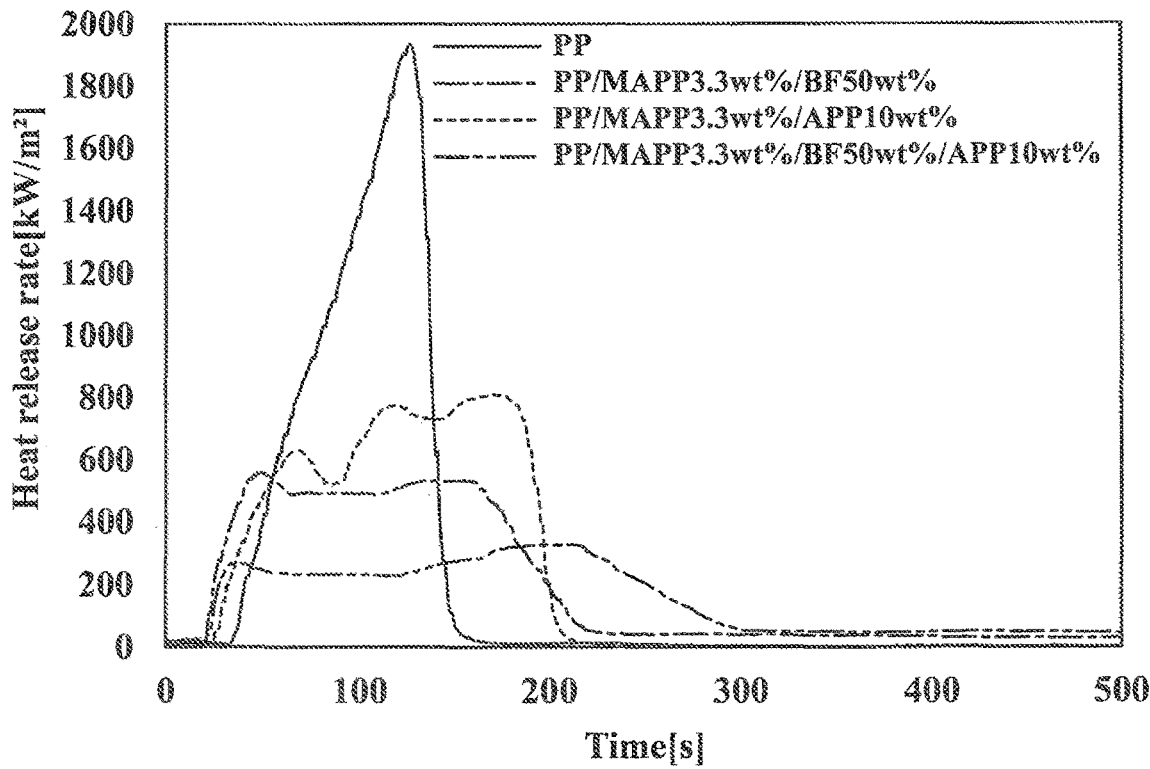
FIG. 10 is a graph illustrating the relationships between the heat release rates and the temperature of samples in examples.

FIG. 10 illustrates the relationships between the heat release rates and the temperature of the samples in:

Reference example 3 (PP/MAPP, 3.3 wt %/BF, 50 wt %/APP, 10 wt %),

Comparative example 1 (PP),
Comparative example 2 (PP/MAPP, 3.3 wt %/APP, 10 wt %), and
Comparative example 13 (PP/MAPP, 3.3 wt %/BF, 50 wt %).

Figure 11:
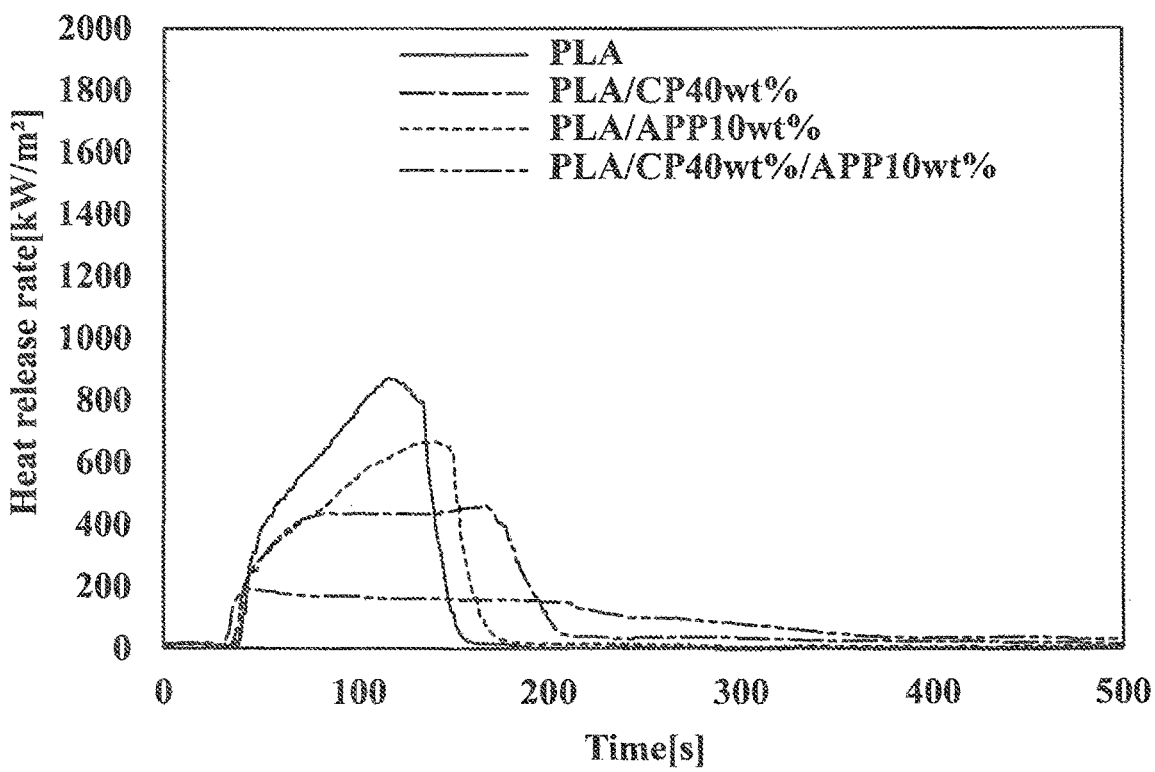
FIG. 11 is a graph illustrating the relationships between the heat release rates and the temperature of samples in examples.

FIG. 11 illustrates the relationships between the heat release rates and the temperature of the samples in:
Example 5 (PLA/CP, 40 wt %/APP, 10 wt %),
Comparative example 14 (PLA),
Comparative example 15 (PLA/APP, 10 wt %), and
Comparative example 18 (PLA/CP, 40 wt %).

(3) Results of Measurement of Formation Rate and Thickness of Char Layer

Tables 11 and 12 present the results of measurement of the formation rates and the thickness of the char layers.

TABLE 11

| | PP | MAPP | CP | Pulp | BF | APP | Char layer formation rate (mm/s) |
|---|---|---|---|---|---|---|---|
| Example 1 | 36.7 | 3.3 | 50 | — | — | 10 | 0.0335 |
| Example 2 | 36.7 | 3.3 | — | 50 | — | 10 | 0.0217 |
| Reference example 3 | 36.7 | 3.3 | — | — | 50 | 10 | 0.0311 |
| Comparative example 1 | 100 | — | — | — | — | — | — |
| Comparative example 2 | 86.7 | 3.3 | — | — | — | 10 | — |
| Comparative example 3 | 86.7 | 3.3 | 10 | — | — | — | — |
| Comparative example 4 | 66.7 | 3.3 | 30 | — | — | — | 0.0023 |
| Comparative example 5 | 46.7 | 3.3 | 50 | — | — | — | 0.0084 |
| Comparative example 6 | 76.7 | 3.3 | 10 | — | — | 10 | — |
| Comparative example 7 | 56.7 | 3.3 | 30 | — | — | 10 | 0.0214 |
| Comparative example 8 | 86.7 | 3.3 | — | 10 | — | — | — |
| Comparative example 9 | 66.7 | 3.3 | — | 30 | — | — | 0.0073 |
| Comparative example 10 | 46.7 | 3.3 | — | 50 | — | — | 0.0093 |
| Comparative example 11 | 76.7 | 3.3 | — | 10 | — | 10 | — |
| Comparative example 12 | 56.7 | 3.3 | — | 30 | — | 10 | 0.0229 |
| Comparative example 13 | 46.7 | 3.3 | — | — | 50 | — | 0.0160 |

TABLE 12

| | PLA | CP | APP | Char layer formation rate (mm/s) |
|---|---|---|---|---|
| Example 4 | 60 | 30 | 10 | 0.0223 |
| Example 5 | 50 | 40 | 10 | 0.0265 |
| Comparative example 14 | 100 | — | — | — |
| Comparative example 15 | 90 | — | 10 | — |
| Comparative example 16 | 90 | 10 | — | — |
| Comparative example 17 | 70 | 30 | — | 0.0042 |
| Comparative example 18 | 60 | 40 | — | 0.0057 |
| Comparative example 19 | 80 | 10 | 10 | — |

Figure 12:
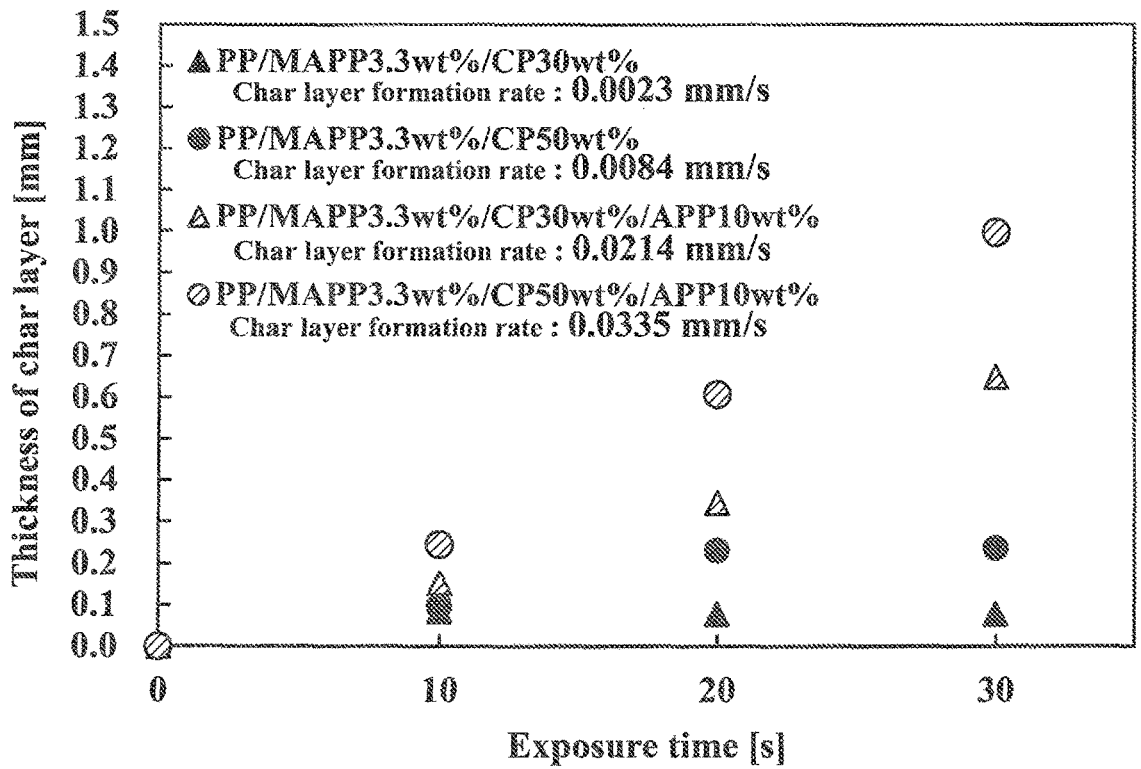
FIG. 12 is a graph illustrating the relationships between the burning time and the thickness of char layers of samples in examples.

FIG. 12 illustrates the relationships between the burning time and the thickness of the char layers of the samples in:
Example 1 (PP/MAPP, 3.3 wt %/CP, 50 wt %/APP, 10 wt %),
Comparative example 4 (PP/MAPP, 3.3 wt %/CP, 30 wt %),
Comparative example 5 (PP/MAPP, 3.3 wt %/CP, 50 wt %), and
Comparative example 7 (PP/MAPP, 3.3 wt %/CP, 30 wt %/APP, 10 wt %).

Figure 13:
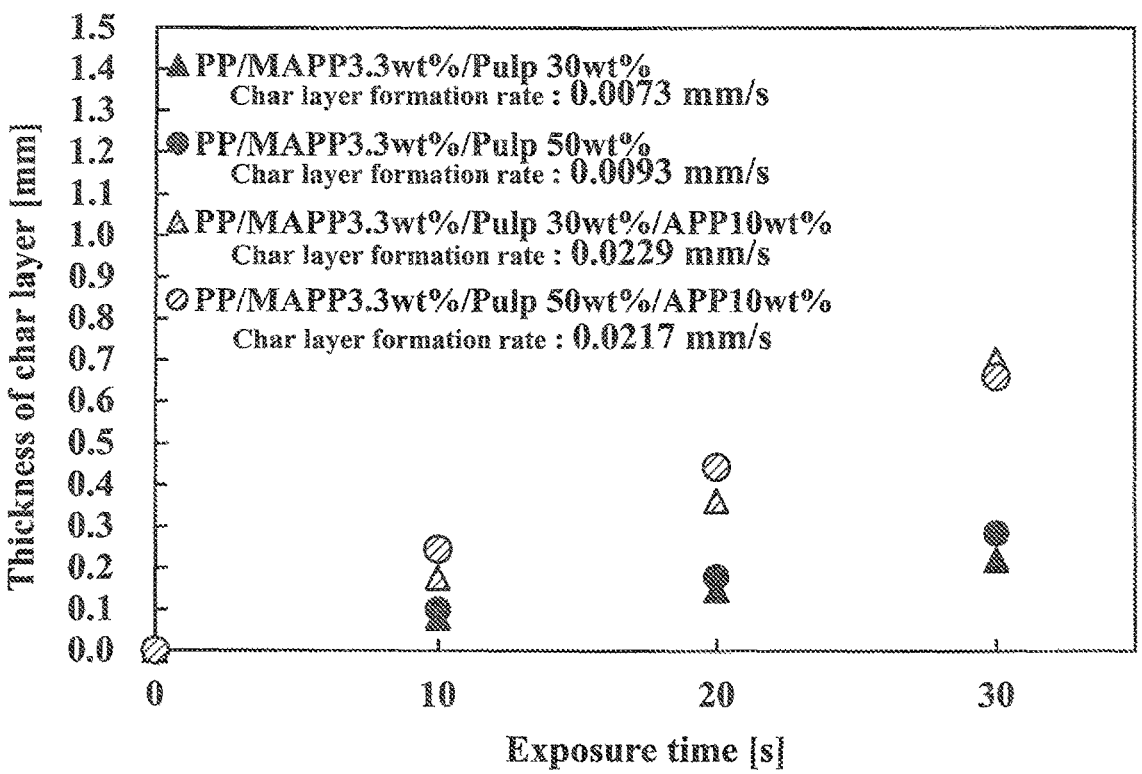
FIG. 13 is a graph illustrating the relationships between the burning time and the thickness of char layers of samples in examples.

FIG. 13 illustrates the relationships between the burning time and the thickness of the char layers of the samples in:
Example 2 (PP/MAPP, 3.3 wt %/Pulp, 50 wt %/APP, 10 wt %),
Comparative example 9 (PP/MAPP, 3.3 wt %/Pulp, 30 wt %),
Comparative example 10 (PP/MAPP, 3.3 wt %/Pulp, 50 wt %), and
Comparative example 12 (PP/MAPP, 3.3 wt %/Pulp, 30 wt %/APP, 10 wt %).

Figure 14:
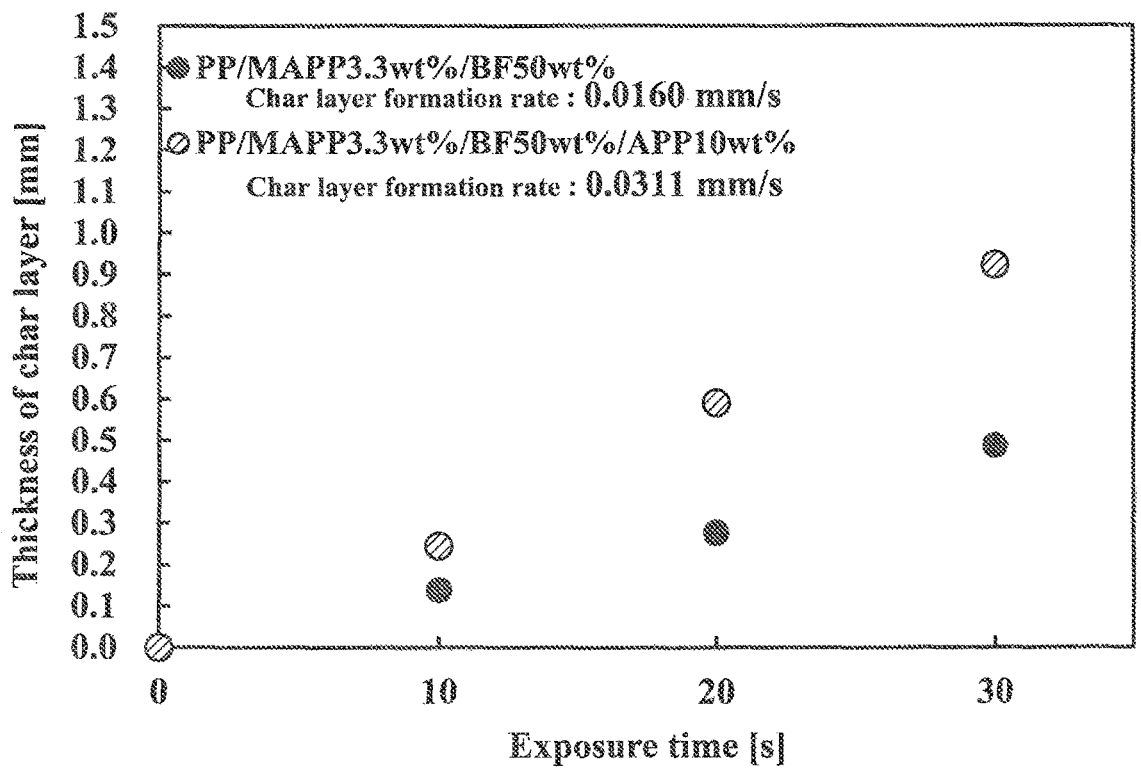
FIG. 14 is a graph illustrating the relationships between the burning time and the thickness of char layers of samples in examples.

FIG. 14 illustrates the relationships between the burning time and the thickness of the char layers of the samples in:
Reference example 3 (PP/MAPP, 3.3 wt %/BF, 50 wt %/APP, 10 wt %), and
Comparative example 13 (PP/MAPP, 3.3 wt %/BF, 50 wt %).

Figure 15:
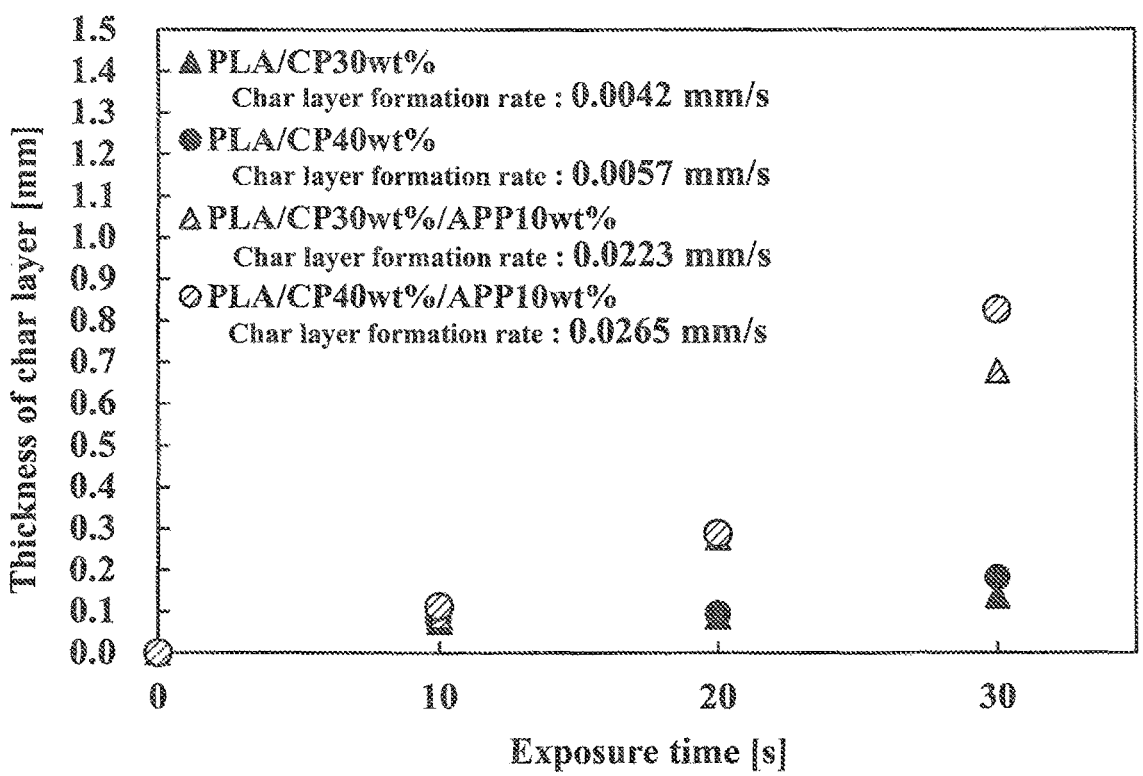
FIG. 15 is a graph illustrating the relationships between the burning time and the thickness of char layers of samples in examples.

FIG. 15 illustrates the relationships between the burning time and the thickness of the char layers of the samples in:
Example 4 (PLA/CP, 30 wt %/APP, 10 wt %),
Example 5 (PLA/CP, 40 wt %/APP, 10 wt %),
Comparative example 17 (PLA/CP, 30 wt %), and
Comparative example 18 (PLA/CP, 40 wt %).

(4) Results of Observation of Charred Material

Figure 16:
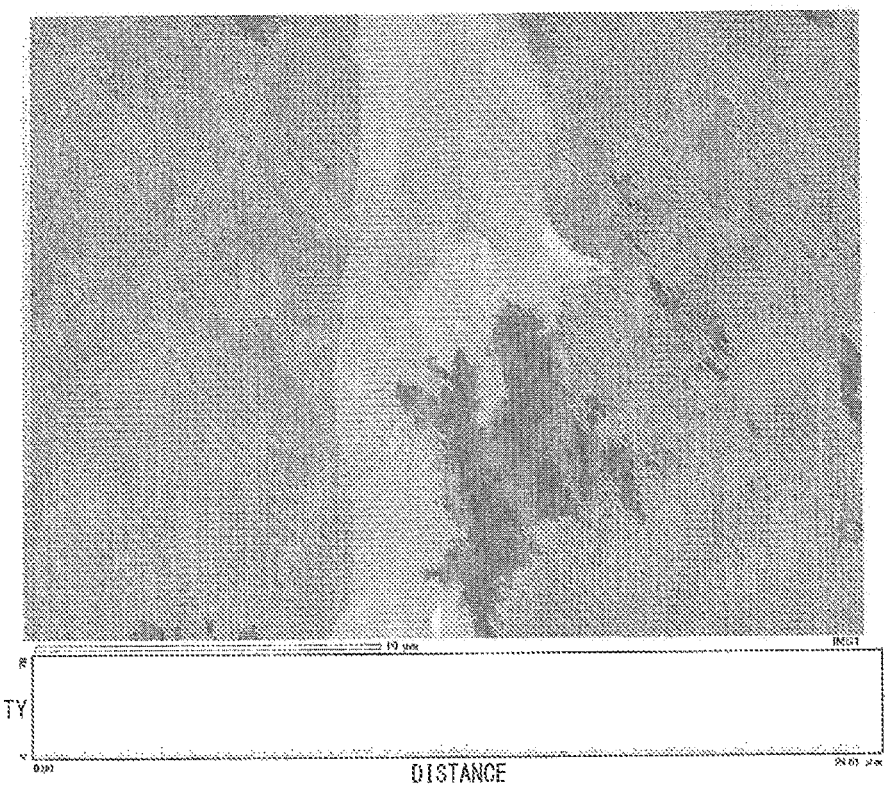
FIG. 16 is a photograph illustrating the results of elemental analysis by EDS of samples (after horizontal burning test) in examples.
Figure 17:
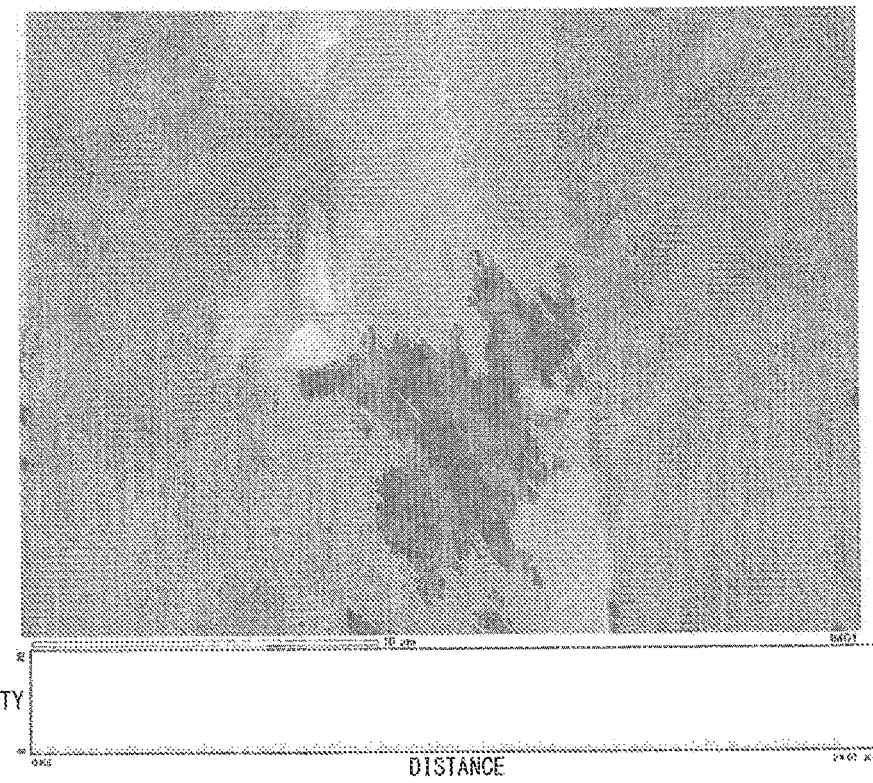
FIG. 17 is a photograph illustrating the results of elemental analysis by EDS of samples (after horizontal burning test) in examples.

FIGS. 16 and 17 illustrate the results of the elemental analysis, by EDS, of the charred materials for phosphorus after the horizontal burning test in:
Comparative example 5 (PP/MAPP, 3.3 wt %/CP, 50 wt %), and
Comparative example 18 (PLA/CP, 40 wt %), respectively.

FIGS. 18A, 18B, 19A and 19B illustrate the results of the elemental analysis, by EDS, of the charred materials for phosphorus after the vertical burning test in:
Example 1 (PP/MAPP, 3.3 wt %/CP, 50 wt %/APP, 10 wt %), and
Example 5 (PLA/CP, 40 wt %/APP, 10 wt %), respectively.

Figure 18A:
FIG. 18A and FIG. 18B illustrate photographs of the results of elemental analysis by EDS of samples (after vertical burning test) in examples.
Figure 18A:
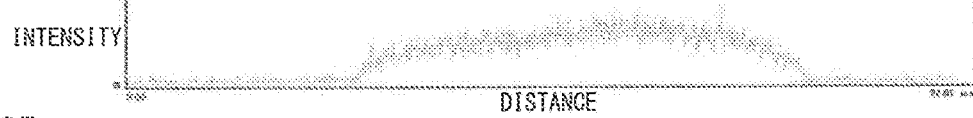
Figure 18B:
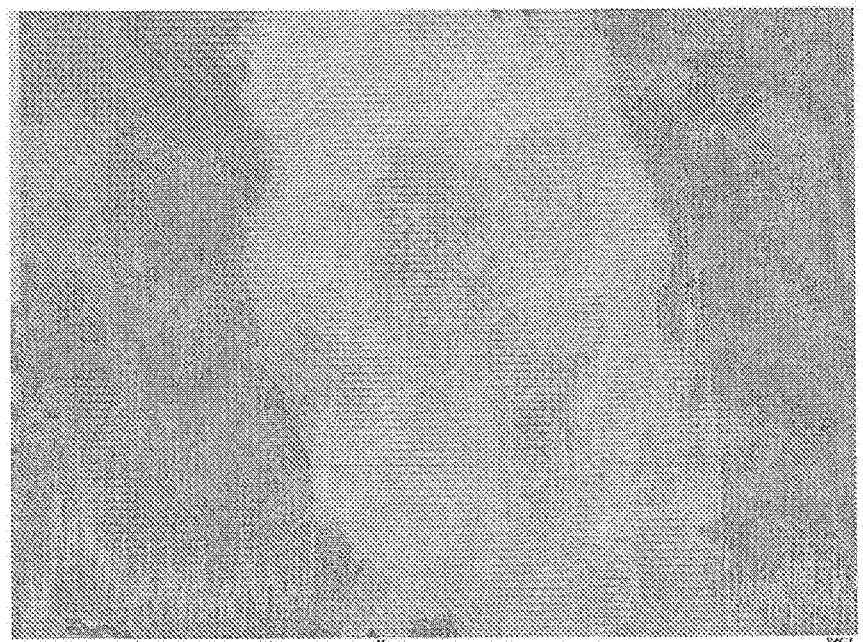
Figure 18B:
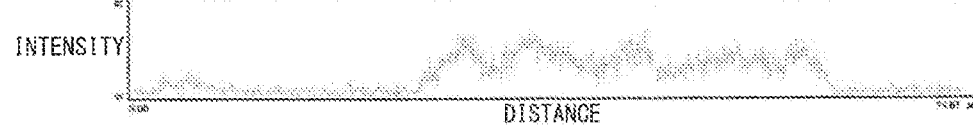
Figure 19A:
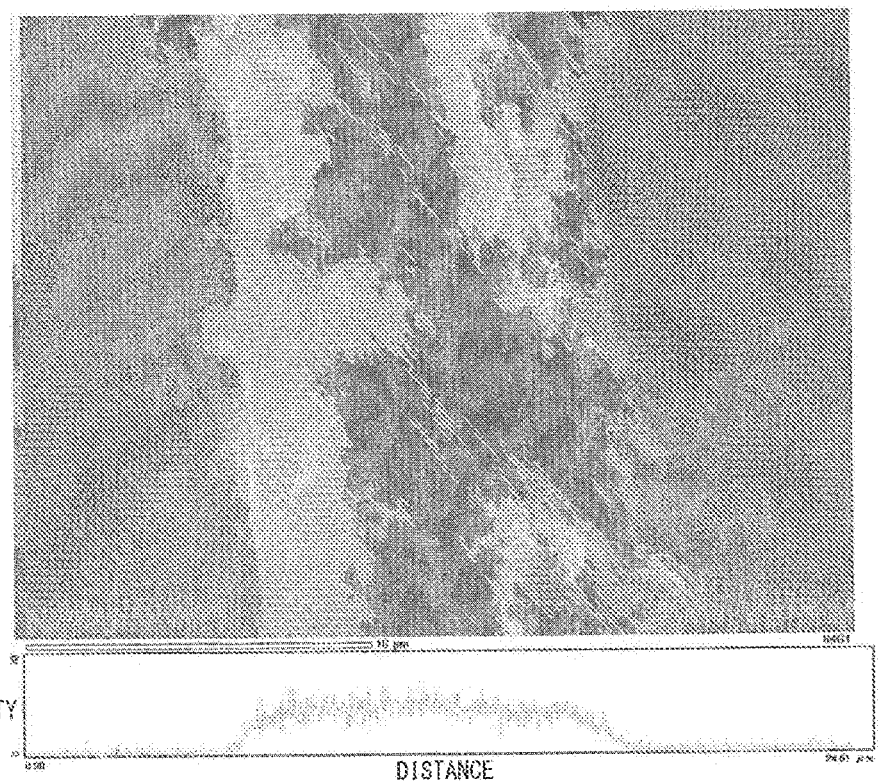
FIG. 19A and FIG. 19B illustrate photographs of the results of elemental analysis by EDS of samples (after vertical burning test) in examples.
Figure 19B:
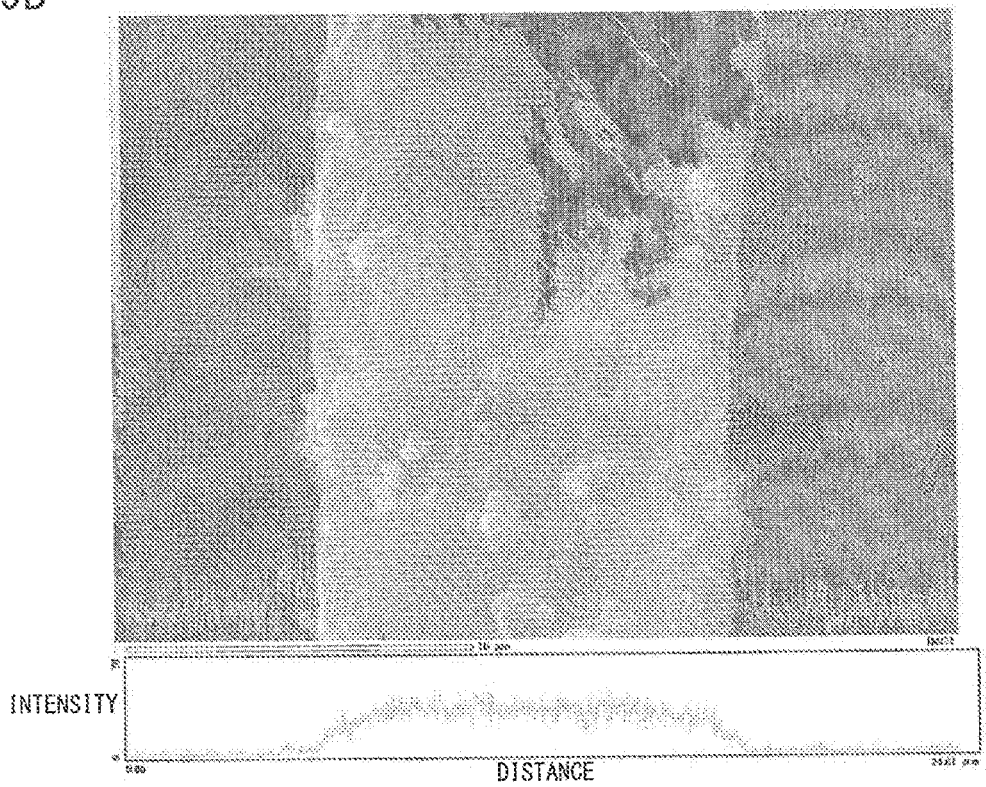

FIG. 18A and FIG. 19B illustrate the results of EDS analysis of the charred materials after performing the flame contact once for 10 seconds. FIG. 18B and FIG. 19B illustrate the results of EDS analysis of the charred materials after performing the flame contact twice for 10 seconds each.

These EDS results indicate that phosphorus was present if a waveform appears along a straight line displayed on an image.

(5) Results of Thermogravimetric Analysis

Tables 13 to 16 present the results of the thermogravimetric analysis.

In the tables below, Ti1 (° C.) and Te1 (° C.) represent the weight loss initiation temperature and the weight loss end temperature, respectively, at the first peak. Ti2 (° C.) and Te2 (° C.) represent the weight loss initiation temperature and the weight loss end temperature, respectively, at the second peak. $T_{5\%}$ represents a temperature (° C.) at a weight loss of 5%.

$V_{max}1$ represents the first peak of the weight loss rate. $T_{max}1$ represents a temperature at $V_{max}1$. $V_{max}2$ represents the second peak of the weight loss rate. $T_{max}2$ represents a temperature at $V_{max}2$.

TABLE 13

|  | PP | MAPP | CP | APP | Ti1 (° C.) Te1 (° C.) | Ti2 (° C.) Te2 (° C.) | $T_{5\%}$ (° C.) | Percentage of remaining charred material at 550° C. (%) | $V_{max}1$ (%/min) $V_{max}2$ (%/min) | $T_{max}1$ (° C.) $T_{max}2$ (° C.) |
|---|---|---|---|---|---|---|---|---|---|---|
| Example 1 | 36.7 | 3.3 | 50 | 10 | 180 | 280 | 235.7 | 10.3 | 0.137 | 247 |
|  |  |  |  |  | 280 | 400 |  |  | 0.098 | 368 |
| Comparative example 1 | 100 | — | — | — | 270 | — | 281.0 | 0.0 | 0.239 | 360 |
|  |  |  |  |  | 390 | — |  |  | — | — |
| Comparative example 2 | 86.7 | 3.3 | — | 10 | 220 | 400 | 273.0 | 6.6 | 0.177 | 375 |
|  |  |  |  |  | 400 | 570 |  |  | 0.011 | 480 |
| Comparative example 3 | 86.7 | 3.3 | 10 | — | 220 | 400 | 282.9 | 0.0 | 0.260 | 353 |
|  |  |  |  |  | 400 | 490 |  |  | 0.007 | 459 |
| Comparative example 4 | 66.7 | 3.3 | 30 | — | 220 | 400 | 280.9 | 0.0 | 0.242 | 338 |
|  |  |  |  |  | 400 | 490 |  |  | 0.023 | 480 |
| Comparative example 5 | 46.7 | 3.3 | 50 | — | 220 | 363 | 274.2 | 0.0 | 0.369 | 330 |
|  |  |  |  |  | 363 | 460 |  |  | 0.054 | 440 |
| Comparative example 6 | 76.7 | 3.3 | 10 | 10 | 220 | 310 | 279.5 | 10.3 | 0.102 | 295 |
|  |  |  |  |  | 310 | 400 |  |  | 0.122 | 342 |
| Comparative example 7 | 56.7 | 3.3 | 30 | 10 | 220 | 300 | 271.2 | 10.5 | 0.126 | 269 |
|  |  |  |  |  | 300 | 400 |  |  | 0.150 | 367 |

TABLE 14

|  | PP | MAPP | Pulp | APP | Ti1 (° C.) Te1 (° C.) | Ti2 (° C.) Te2 (° C.) | $T_{5\%}$ (° C.) | Percentage of remaining charred material at 550° C. (%) | $V_{max}1$ (%/min) $V_{max}2$ (%/min) | $T_{max}1$ (° C.) $T_{max}2$ (° C.) |
|---|---|---|---|---|---|---|---|---|---|---|
| Example 2 | 36.7 | 3.3 | 50 | 10 | 180 | 280 | 247.8 | 10.4 | 0.130 | 252 |
|  |  |  |  |  | 280 | 400 |  |  | 0.160 | 344 |
| Comparative example 8 | 86.7 | 3.3 | 10 | — | 220 | 383 | 280.7 | 0.0 | 0.229 | 351 |
|  |  |  |  |  | 383 | 480 |  |  | 0.006 | 460 |
| Comparative example 9 | 66.7 | 3.3 | 30 | — | 220 | 360 | 266.3 | 0.0 | 0.251 | 320 |
|  |  |  |  |  | 360 | 480 |  |  | 0.034 | 447 |
| Comparative example 10 | 46.7 | 3.3 | 50 | — | 210 | 280 | 250.1 | 0.0 | 0.190 | 252 |
|  |  |  |  |  | 280 | 350 |  |  | 0.233 | 315 |
| Comparative example 11 | 76.7 | 3.3 | 10 | 10 | 220 | 320 | 285.2 | 10.4 | 0.091 | 299 |
|  |  |  |  |  | 320 | 413 |  |  | 0.170 | 380 |
| Comparative example 12 | 56.7 | 3.3 | 30 | 10 | 220 | 290 | 264.0 | 10.4 | 0.091 | 269 |
|  |  |  |  |  | 290 | 400 |  |  | 0.158 | 367 |

TABLE 15

|  | PP | MAPP | BF | APP | Ti1 (° C.) Te1 (° C.) | Ti2 (° C.) Te2 (° C.) | $T_{5\%}$ (° C.) | Percentage of remaining charred material at 550° C. (%) | $V_{max}1$ (%/min) $V_{max}2$ (%/min) | $T_{max}1$ (° C.) $T_{max}2$ (° C.) |
|---|---|---|---|---|---|---|---|---|---|---|
| Reference example 3 | 36.7 | 3.3 | 50 | 10 | 200 | 288 | 252.4 | 11.3 | 0.072 | 263 |
|  |  |  |  |  | 288 | 400 |  |  | 0.165 | 351 |
| Comparative example 13 | 46.7 | 3.3 | 50 | — | 200 | — | 278.8 | 0.0 | 0.247 | 373 |
|  |  |  |  |  | 420 | — |  |  | — | — |

TABLE 16

| | PLA | CP | APP | Ti1 (°C.) Te1 (°C.) | Ti2 (°C.) Te2 (°C.) | $T_{5\%}$ (°C.) | Percentage of remaining charred material at 550° C. (%) | $V_{max}1$ (%/min) $V_{max}2$ (%/min) | $T_{max}1$ (°C.) $T_{max}2$ (°C.) |
|---|---|---|---|---|---|---|---|---|---|
| Example 4 | 60 | 30 | 10 | 180 260 | 260 380 | 231.7 | 9.0 | 0.083 0.378 | 231 343 |
| Example 5 | 50 | 40 | 10 | 175 245 | 245 380 | 219.7 | 8.0 | 0.093 0.331 | 225 340 |
| Comparative example 14 | 100 | — | — | 300 380 | — — | 328.5 | 0.0 | 0.579 — | 350 — |
| Comparative example 15 | 90 | — | 10 | 280 370 | — — | 326.3 | 4.0 | 0.556 — | 339 — |
| Comparative example 16 | 90 | 10 | — | 270 400 | — — | 317.6 | 0.0 | 0.578 — | 349 — |
| Comparative example 17 | 70 | 30 | — | 240 420 | 420 530 | 318.0 | 0.0 | 0.467 0.012 | 346 500 |
| Comparative example 18 | 60 | 40 | — | 260 380 | 380 500 | 316.3 | 0.0 | 0.423 0.028 | 344 475 |
| Comparative example 19 | 80 | 10 | 10 | 222 280 | 280 380 | 273.9 | 4.0 | 0.028 0.497 | 257 344 |

Figure 20:
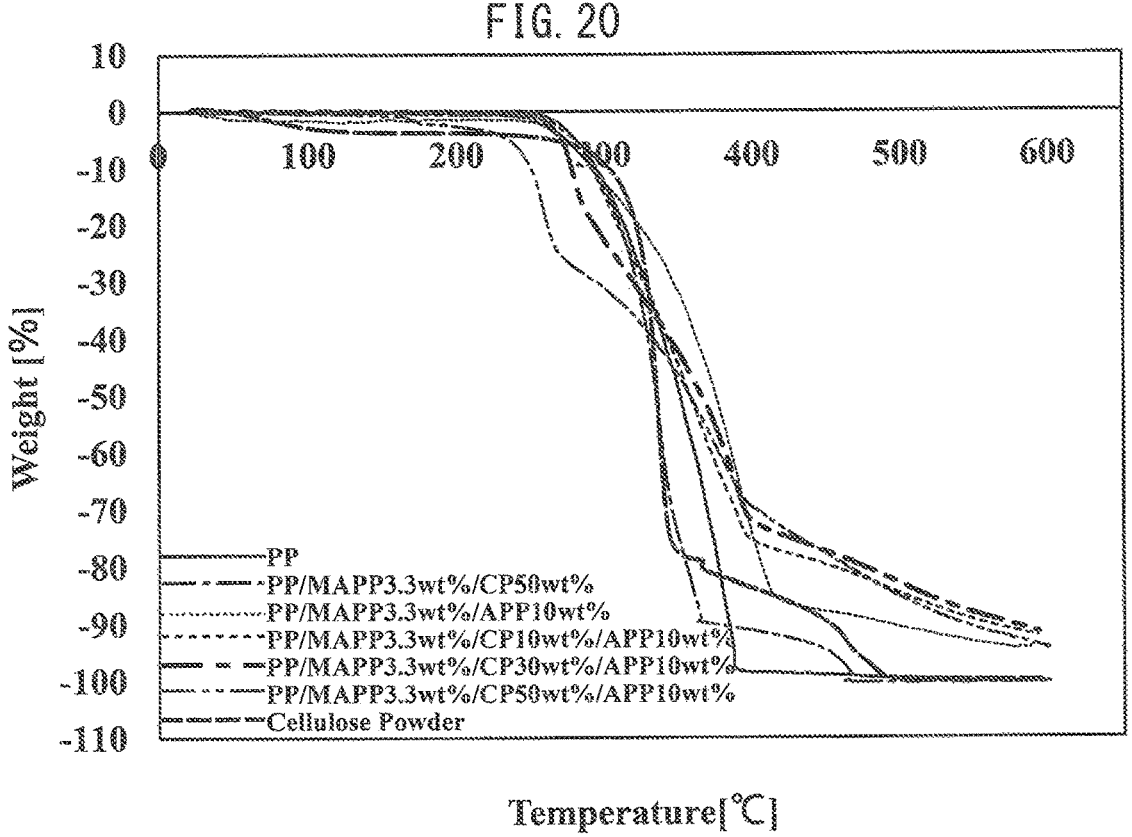
FIG. 20 is a graph illustrating the relationships between the weight loss percentage and the temperature of samples in examples.

FIG. 20 illustrates the relationships between the weight loss percentage and the temperature of the samples in:
Example 1 (PP/MAPP, 3.3 wt %/CP, 50 wt %/APP, 10 wt %),
Comparative example 1 (PP),
Comparative example 2 (PP/MAPP, 3.3 wt %/APP, 10 wt %),
Comparative example 5 (PP/MAPP, 3.3 wt %/CP, 50 wt %),
Comparative example 6 (PP/MAPP, 3.3 wt %/CP, 10 wt %/APP, 10 wt %), and
Comparative example 7 (PP/MAPP, 3.3 wt %/CP, 30 wt %/APP, 10 wt %).
For reference, data for a cellulose powder (Cellulose Powder) was also depicted.

Figure 21:
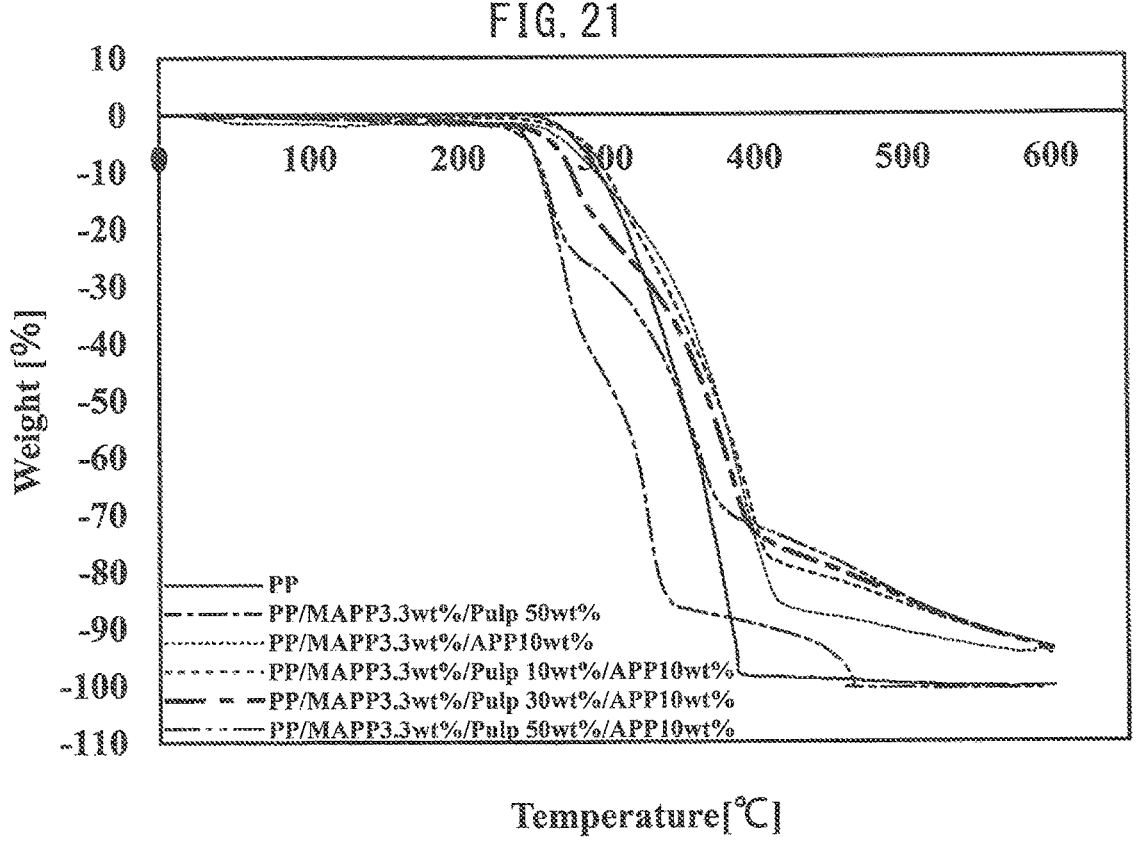
FIG. 21 is a graph illustrating the relationships between the weight loss percentage and the temperature of samples in examples.

FIG. 21 illustrates the relationships between the weight loss percentage and the temperature of the samples in:
Example 2 (PP/MAPP, 3.3 wt %/Pulp 50 wt %/APP, 10 wt %),
Comparative example 1 (PP),
Comparative example 2 (PP/MAPP, 3.3 wt %/APP, 10 wt %),
Comparative example 10 (PP/MAPP, 3.3 wt %/Pulp, 50 wt %),
Comparative example 11 (PP/MAPP, 3.3 wt %/Pulp, 10 wt %/APP, 10 wt %), and
Comparative example 12 (PP/MAPP, 3.3 wt %/Pulp, 30 wt %/APP, 10 wt %).

Figure 22:
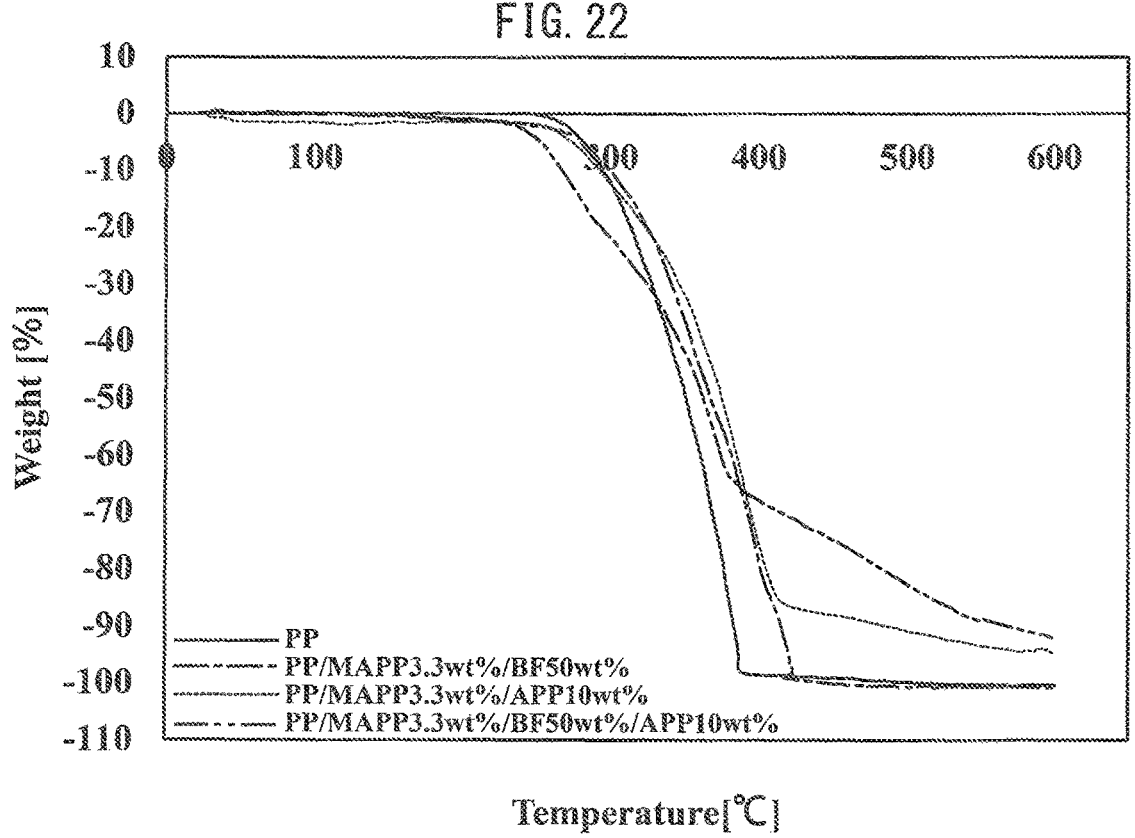
FIG. 22 is a graph illustrating the relationships between the weight loss percentage and the temperature of samples in examples.

FIG. 22 illustrates the relationships between the weight loss percentage and the temperature of the samples in:
Reference example 3 (PP/MAPP, 3.3 wt %/BF, 50 wt %/APP, 10 wt %),
Comparative example 1 (PP),
Comparative example 2 (PP/MAPP, 3.3 wt %/APP, 10 wt %), and
Comparative example 13 (PP/MAPP, 3.3 wt %/BF, 50 wt %).

Figure 23:
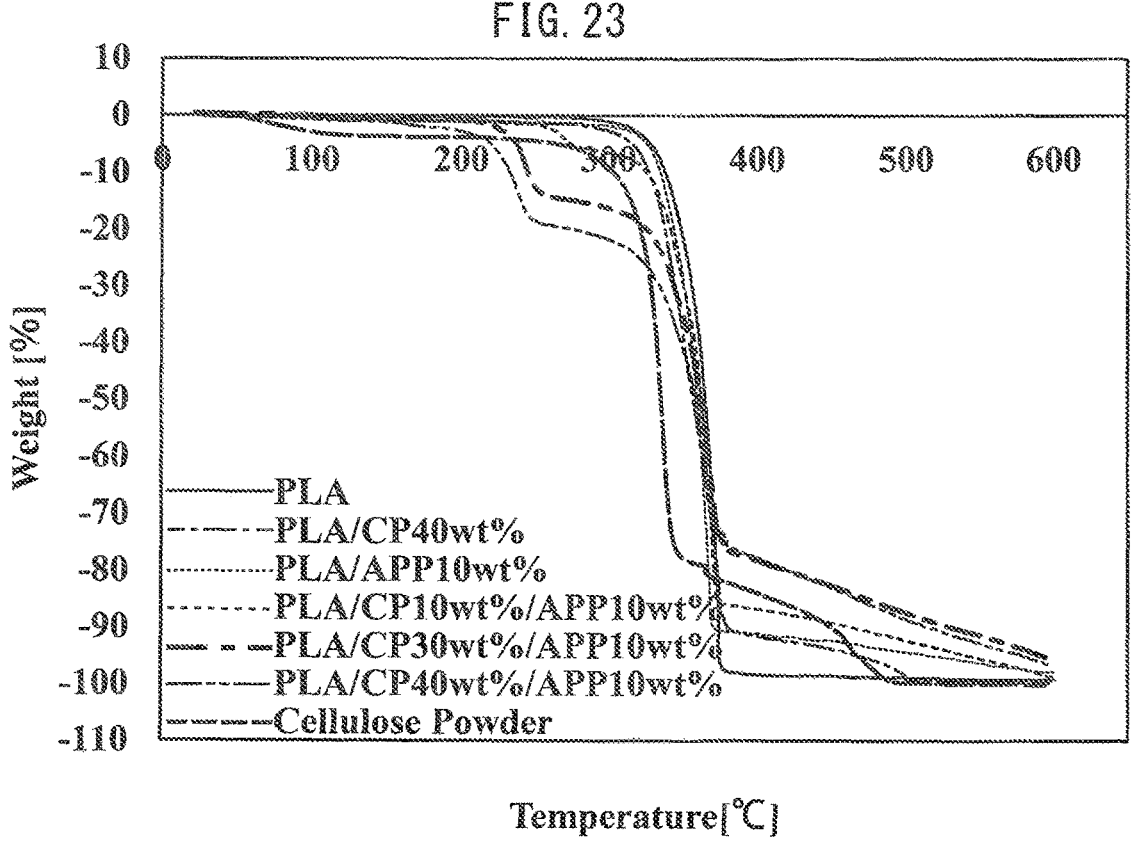
FIG. 23 is a graph illustrating the relationships between the weight loss percentage and the temperature of samples in examples.

FIG. 23 illustrates the relationships between the weight loss percentage and the temperature of the samples in:
Example 4 (PLA/CP, 30 wt %/APP, 10 wt %),
Example 5 (PLA/CP, 40 wt %/APP, 10 wt %),
Comparative example 14 (PLA),
Comparative example 15 (PLA/APP, 10 wt %),
Comparative example 18 (PLA/CP, 40 wt %), and
Comparative example 19 (PLA/CP, 10 wt %/APP, 10 wt %).
For reference, data for a cellulose powder (Cellulose Powder) was also depicted.

Figure 24:
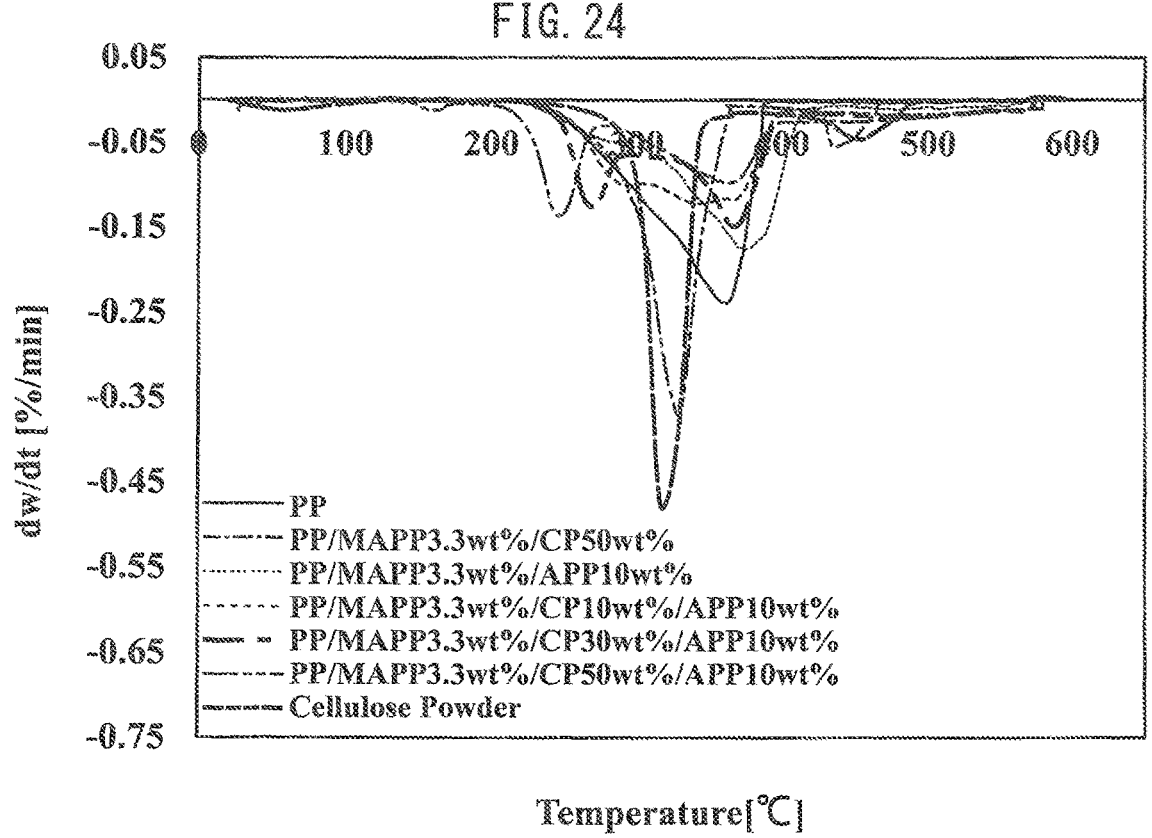
FIG. 24 is a graph illustrating the relationships between the weight loss percentage and the temperature of samples in examples.
Figure 25:
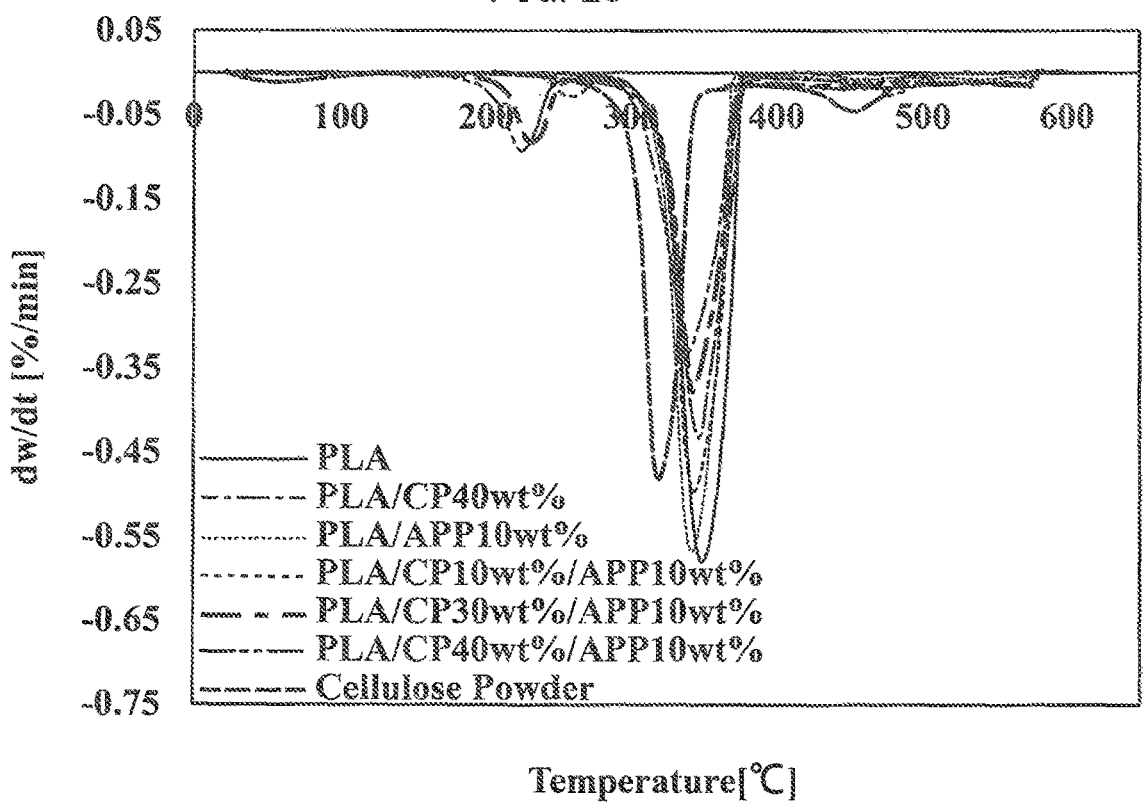
FIG. 25 is a graph illustrating the relationships between the weight loss percentage and the temperature of samples in examples.

FIGS. 24 and 25 are diagrams obtained by converting the weight loss behavior patterns illustrated in FIGS. 20 and 23 into the weight loss rates.

DISCUSSION (1) Flame Retardant Mechanism

To impart flame retardancy to a resin, it is necessary to break the cycle of "ignition→pyrolysis→generation of a combustion gas→combustion→heat release→pyrolysis . . . ".

Examples of a method for breaking the cycle are as follows: The first is a "flame retardant mechanism by a gas phase of a non-combustible gas". This is a method for imparting flame retardancy by the endothermic effect of a non-combustible gas such as water vapor and its effect of diluting a combustible gas generated from the thermal decomposition of the resin.

The second is a "flame retardant mechanism by a solid phase forming a heat-insulating layer". This is a method for imparting flame retardancy to a resin by the fact that the formation of a heat-insulating layer such as a charred layer results in the effect of insulating combustion heat and the effect of blocking a combustible gas generated from the thermal decomposition of the resin.

As seen in the following discussion, the above-mentioned two flame retardant mechanisms seem to play an important role in providing flame retardancy in the present invention.

(2) Regarding Single-Component Thermoplastic Resin

Single-component PP and single-component PLA were not self-extinguishing in the horizontal burning test (see Comparative examples 1 and 14 in Tables 7 and 8). Both samples exhibited dripping and melting due to combustion heat during horizontal burning.

The single-component PLA had a lower burning rate and a lower heat release rate than those of the single-component (see Comparative examples 1 and 14 in Tables 7 to 10).

This result is thought to be due to a difference in chemical formula between PP and PLA.

The chemical formulae of PP and PLA are $(C_3H_6)_n$ and $(C_3H_4O_2)_n$, respectively. PP does not have an oxygen atom and thus reacts with oxygen in air to burn. Oxygen in air alone is insufficient, causing incomplete combustion. This generates substances, such as carbon monoxide and soot, that cause combustion spreading. As a result, it is thought that the heat release rate was very high and combustion spread.

PLA has oxygen atoms and does not run out of oxygen during combustion. Thus, complete combustion is achieved to form a non-combustible gas containing carbon dioxide and water. As a result, the heat release rate is seemingly lower than PP. However, it is thought that PLA was not able to generate the non-combustible gas to the extent that combustion spreading was stopped; thus, PLA was not self-extinguishing.

(3) Regarding Addition of Cellulosic Material Alone

In the case of adding the cellulosic material alone, neither PP-based samples nor PLA-based samples were self-extinguishing in the horizontal burning test (see Comparative examples 3 to 5, 8 to 10, 13, and 16 to 18 in Tables 7 and 8). A simple increase in the amount of CP added inhibited dripping and melting phenomena due to combustion heat.

Tables 9 and 10 and FIGS. 8 to 11 indicated that in all the PP-based samples and the PLA-based samples, the addition of the cellulosic material reduced the heat release rate.

This result is thought to be due to the endothermic reaction of the water formed by the dehydration reaction of the cellulosic material caused by combustion heat.

In other words, it is thought that the addition of the cellulosic material developed the "flame retardant mechanism by a gas phase of a non-combustible gas".

Carbon should have been generated by the dehydration reaction. However, as can be seen from Tables 11 and 12, the char layer formation rate is low in both the PP-based samples and the PLA-based samples.

The reason for this is presumably that a dehydration reaction did not occur and thus only hydrogen was released, not in the form of water molecules. It is said that when hydrogen is released, the remaining carbon and oxygen are combined to form a combustible gas such as carbon monoxide (Masaru Saito, "Takaga Mokutan, Saredo Mokutan (Merely Charcoal, Better Yet Charcoal) (1)", Rinsanshi Dayori (Forest Product Research Institute Letter), October, (1993), pp. 6-12).

It is thought that although the addition of the cellulosic material provided the endothermic reaction of the water formed by the dehydration reaction, when only hydrogen was released without the occurrence of the dehydration reaction, carbon that should have remained as a char layer was converted into a combustible gas such as carbon monoxide to cause combustion spreading.

(4) Regarding Addition of Phosphate-Based Flame Retardant Alone

In the case of adding the phosphate-based flame retardant alone, the combustion of the PP-based samples spread, and the PLA-based samples exhibited self-extinguishing properties in the horizontal burning test (see Comparative example 2 in Table 7, and Comparative example 15 in Table 8).

Tables 9 and 10 and FIGS. 8 to 11 indicated that in all the PP-based samples and the PLA-based samples, the addition of the phosphate-based flame retardant reduced the heat release rate.

APP is also excellent in terms of "the elimination of ammonia" and the formation of a non-combustible gas such as "the formation of water due to a dehydration reaction" when heated. The "effect of diluting a combustible gas" and the "endothermic reaction of water" were seemingly provided by the non-combustible gas. In other words, it is thought that the addition of APP developed the "flame retardant mechanism by a gas phase of a non-combustible gas".

In the case of PLA, in addition to this, a non-combustible gas was formed by complete combustion as described above, so that the "flame retardant mechanism by a gas phase of a non-combustible gas" developed more strongly.

For the above reasons, it is considered that only PLA/APP exhibited self-extinguishing properties in the horizontal burning test. However, the flame spread to drips formed during combustion. Even if the self-extinguishing properties were exhibited, it was thought that there was a possibility that the flame can spread by the drips. Thus, class HB, which is the worst flame retardancy, was given in this experiment.

(5) Regarding Combination Use of Cellulosic Material and Phosphate-Based Flame Retardant As described in (2) to (4) above, the thermoplastic resins are highly flammable, and sufficient flame retardant properties cannot be obtained by adding the cellulosic material or the phosphate-based flame retardant separately.

However, the combination use of the cellulosic material and the phosphate-based flame retardant provides high flame retardancy because of the synergistic effect. No drips were observed in any of the PP-based samples and the PLA-based samples in the horizontal burning test.

The char layer formation is clearly different from the case of adding the cellulosic material or the phosphate-based flame retardant alone.

It can be seen that the char layer formation rate is increased in both the PP-based samples and the PLA-based samples (see Examples 1 and 2 and Reference example 3 in Table 11, Comparative examples 7 and 12, and Examples 4 and 5 in Table 12).

The reason for this is presumably that the promotion of the dehydration reaction of the cellulosic material with the phosphate-based flame retardant increases the char layer formation to develop the "flame retardant mechanism by a solid phase forming a char layer".

Furthermore, an increase in the amount of the cellulosic material added together with the phosphate-based flame retardant increases the amount of the cellulosic material promoted by the phosphate-based flame retardant to increase the char layer formation rate.

Substantially no difference was observed in the char layer formation rate between the PP-based samples and the PLA-based samples (see Comparative example 7 in Table 11 and Example 4 in Table 12).

In other words, there is no difference in the promotion of the char layer formation of CP by APP due to the difference between PP and PLA (for example, the combustion mode).

It was found that the "flame retardant mechanism by a solid phase forming a char layer" was developed regardless of the difference in thermoplastic resin.

However, a difference in self-extinguishing properties was observed between PP and PLA, even though the amount of APP added was the same for the addition of 10% by weight of CP and the addition of 30% by weight of CP (see Comparative examples 6 and 7 in Table 7 and Comparative example 19 and Example 4 in Table 8).

The reason for this is presumably that, as in the case of adding only APP, PLA formed a non-combustible gas by complete combustion, so that the "flame retardant mechanism by a gas phase of a non-combustible gas" was more strongly developed.

The PP-based samples (Example 1) containing 50% by weight CP exhibited excellent self-extinguishing properties even when the flame contact was performed twice for 10 seconds each in the vertical burning test.

The PLA-based samples containing 30% by weight CP or 40% by weight CP (Examples 4 and 5) also exhibited excellent self-extinguishing properties even when the flame contact was performed twice for 10 seconds each in the vertical burning test.

As can be seen from FIGS. 16 to 19, in each of the char layers of these samples rated as V-0, the charred CP was covered with a phosphorus component. Thus, carbon produced by the first flame contact remained as a char layer without being oxidized by the second flame contact.

Furthermore, the use of a large amount of CP added seemingly promoted the dehydration reaction of CP by APP to increase the char layer formation rate, thereby more strongly developing the "flame retardant mechanism by a solid phase forming a char layer".

As described above, the char layer composed of the cellulosic material is coated with the phosphorous component originating from the phosphate-based flame retardant, so that the "flame retardant mechanism by a solid phase forming a char layer" is developed sufficiently.

FIGS. 8 to 10 indicate that in each of the PP-based samples to which the cellulosic material was added, a curve having two upwardly convex portions was observed.

The first upwardly convex portion indicates behavior in which heat release was suppressed because a char layer was formed by the initial heat release. The second indicates that as a result of continuously applying heat to the material, the char layer once formed collapsed to expose the resin inside and thus heat was released again.

FIG. 11, in contrast, indicates that in each of the PLA-based samples to which the cellulosic material was added, a second convex portion was not observed, and the heat release rate was lower than that of the PP-based samples.

Two possible reasons for this are as follows: First, the char layer formed in the initial stage of heat release did not broken by heat applied continuously. Second, even though the char layer collapsed to expose PLA, heat release was suppressed by a non-combustible gas due to the complete combustion of PLA and the dilution effect of APP using a non-combustible gas.

Accordingly, it was found that the PLA-based samples were more effective in providing the "flame retardant mechanism by a gas phase of a non-combustible gas" than the PP-based samples and thus had better flame retardancy.

In relation to the above, let us now look at the difference in the types of cellulosic materials in the PP-based samples. Regarding the first upwardly convex portion, the BF-added sample has the highest heat release rate. That is, it can be said that it was difficult to suppress the initial heat release in the BF-added samples, compared with the CP-added and Pulp-added samples.

In the case of adding the cellulosic material alone (without using the phosphate-based flame retardant), the BF-added sample has the lowest heat release rate, contrary to the above results in the case of combined use. Thus, the cellulose component seemingly has better compatibility with the phosphate-based flame retardant.

Natural lignin contained in BF forms a strong composite material with cellulose and hemicellulose (Toshiyuki Takano, "Lignin no Riyo ni Mukete (Toward the Use of Lignin)", "Network Polymer", Vol. 31, No. 5, (2010), pp. 213-223). Thus, the presence of lignin seemingly hinders the dehydration reaction by APP.

Looking at the second upwardly convex portion, there is no significant difference in the peak of the heat release rate. However, looking at the exothermic behavior after the peak, in particular, the Pulp-added sample is exothermic.

The reason for this is presumably as follows: Pulp has a large fiber length, compared with CP and BF, which are pulverized into particles. Pulp has a smaller specific surface area, which contributes to a reaction with APP, than CP or BF. It was thus difficult to provide the "flame retardant mechanism by a gas phase of a non-combustible gas" and the "flame retardant mechanism by a solid phase forming a char layer", thereby increasing the total heat release rate.

In fact, the Pulp-added sample exhibited the smallest char layer formation rate (see Examples 1 to 3 in Table 11).

It was found that a cellulosic material containing a large amount of a cellulose component that has no complex structure such as lignin and has a small particle size is effective in developing flame retardancy. In this case, it was found that CP satisfies the conditions and thus APP is highly effective in the dehydration reaction, thereby resulting in better flame retardancy.

As described in detail above, it was found that the promotion of the dehydration reaction of the cellulosic material using a phosphate-based flame retardant is effective in imparting flame retardancy to the thermoplastic resin. The promotion of the dehydration reaction seemingly enabled the formation of large amounts of "water" and "carbon", which are advantages of the addition of the cellulosic material.

It is considered that the formed "water" acted on the "flame retardant mechanism by a gas phase of a non-combustible gas", and the "carbon" acted on the "flame retardant mechanism by a solid phase forming a char layer", so that such a resin was rated as class V-0, which indicates the best flame retardancy.

(6) Regarding Parameter for Developing Flame Retardancy

From the results of the thermogravimetric analysis, it was considered that the fact that the dehydration reaction occurs at a lower temperature is an important factor for developing the "flame retardant mechanism by a gas phase of a non-combustible gas" and the "carbon" acted on the "flame retardant mechanism by a solid phase forming a char layer".

Additionally, it was thought that the effect of the dehydration reaction is easily provided by the thermal decomposition of the thermoplastic resin after the dehydration reaction of the cellulosic material at a low temperature.

Thus, the inventors have focused their attention on a magnitude relationship between the thermoplastic resin and the cellulosic material and a difference between the thermoplastic resin and the resin composition in terms of temperatures at weight loss rate peaks in the thermogravimetric analysis.

With reference to a report that a main pyrolysis reaction in a low-temperature process (<300° C.) is dehydration (Haruo Kawamoto, "Pyrolysis Reaction and Molecular Structure of Cellulose", Mokuzai Gakkaishi, Vol. 61, No. 1, (2015), pp. 127-133), when a weight loss peak (convex downward) was observed on the low temperature side (lower than 300° C.), the peak temperature on the low temperature side was considered.

That is, regarding $T_{max}1$ in Tables 13 to 16, letting $T_{max}1$ of the thermoplastic resin be $T_P$, letting $T_{max}1$ of the cellulosic material be $T_a$, and letting $T_{max}1$ of the resin composition be $T_{CMP}$, attention was focused on a magnitude relationship between $T_P$ and $T_B$, and $T_P-T_{CMP}$.

Figure 26:
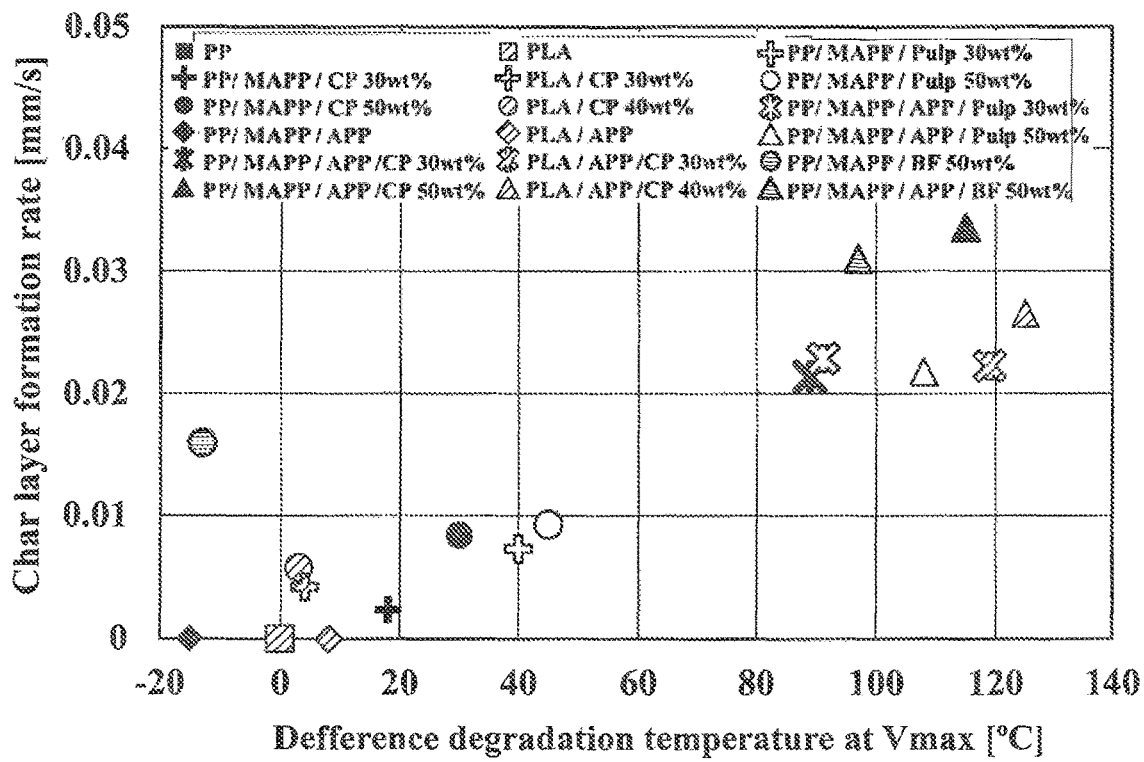
FIG. 26 is a graph illustrating the relationships between differences between $T_P$ and $T_{CMP}$ and the char layer formation rates of samples in examples.
Figure 27:
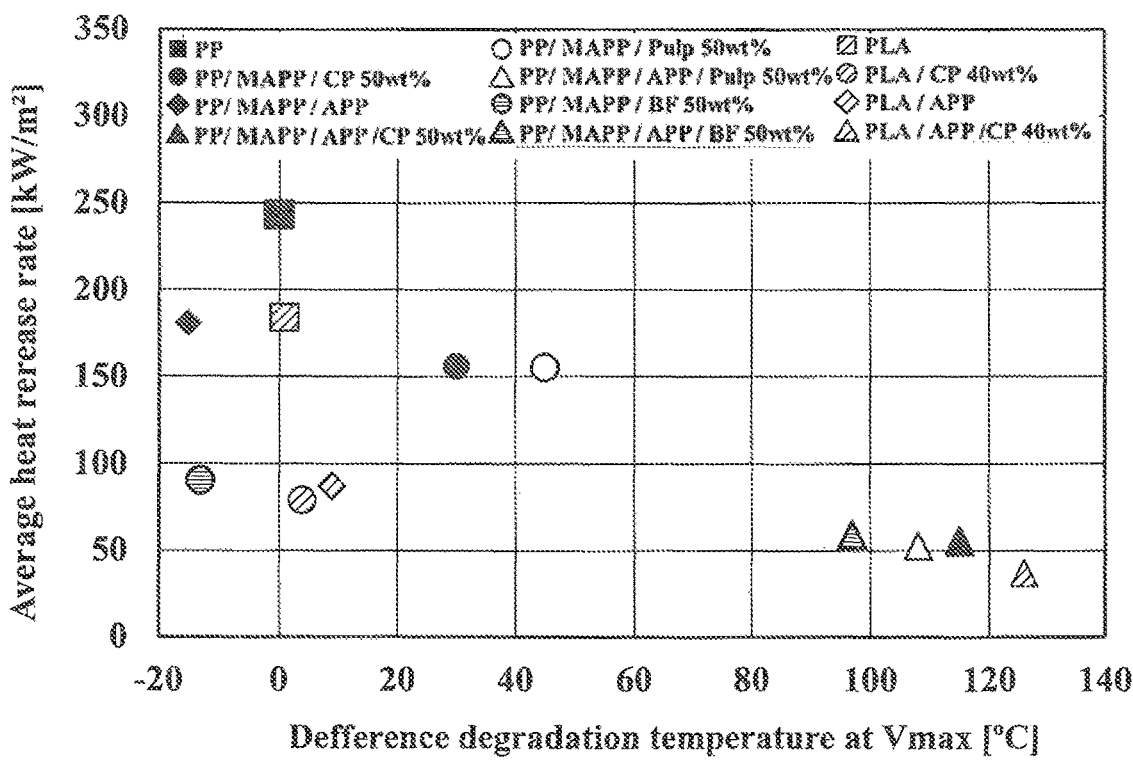
FIG. 27 is a graph illustrating the relationships between differences between $T_P$ and $T_{CMP}$ and the heat release rate of samples in examples.
Figure 28:
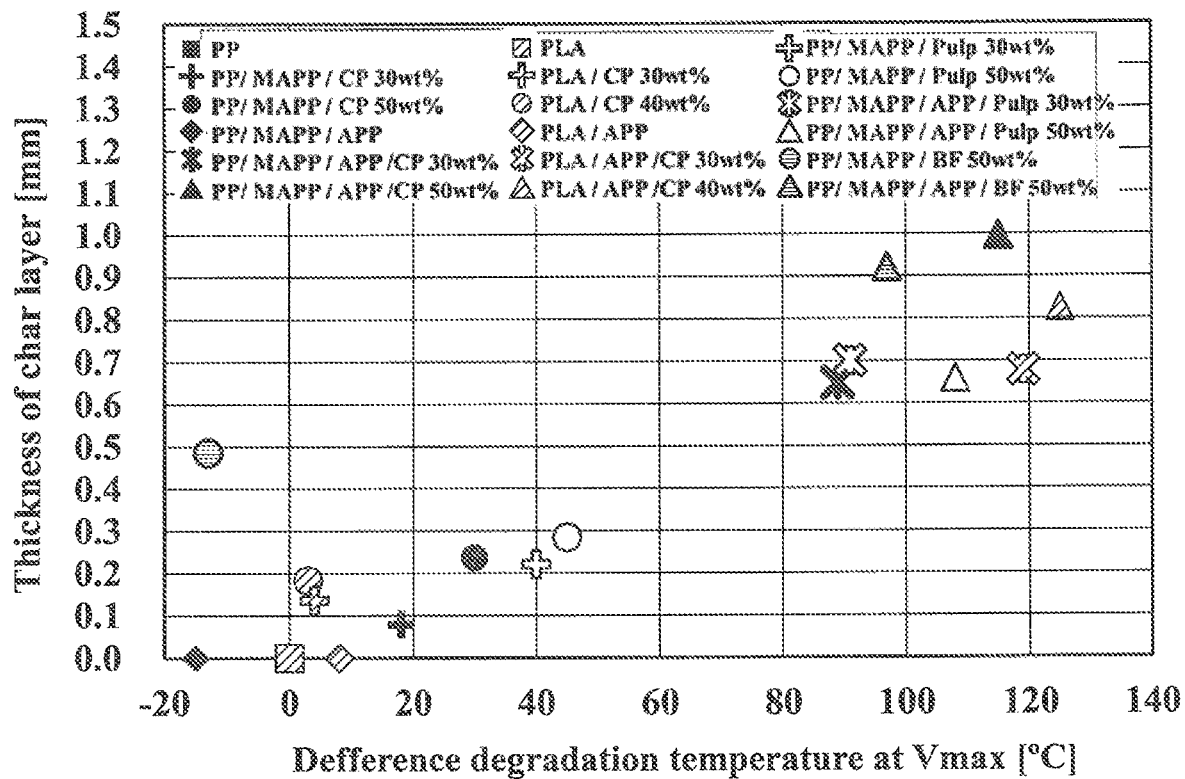
FIG. 28 is a graph illustrating the relationships between differences between $T_P$ and $T_{CMP}$ and the thickness of the char layers of samples in examples.

FIGS. 26 to 28 are graphs that summarize the relationships of the difference between $T_P$ and $T_{CMP}$ to the char layer formation rate, the heat release rate, and the thickness of the char layer.

These graphs indicate that a larger value of $T_P$-$T_{CMP}$ results in an increase in char layer formation rate and a reduction in heat release rate.

It can be said that how to reduce the peak temperature of the thermal decomposition of the thermoplastic resin is one of the factors in developing flame retardancy.

The following tables summarize the values of $T_P$, $T_B$, $T_{CMP}$, $T_P$-$T_{CMP}$ and the results of flame retardancy in the examples and the comparative examples.

TABLE 17

| | PP | MAPP | CP | APP | $T_P$ | $T_B$ | $T_{CMP}$ | $T_P - T_{CMP}$ | Class based on UL standard |
|---|---|---|---|---|---|---|---|---|---|
| Example 1 | 36.7 | 3.3 | 50 | 10 | 360 | 319 | 247 | 113 | V-0 |
| Comparative example 1 | 100 | — | — | — | 360 | — | — | — | HB |
| Comparative example 2 | 86.7 | 3.3 | — | 10 | 360 | — | 375 | −15 | HB |
| Comparative example 3 | 86.7 | 3.3 | 10 | — | 360 | 319 | 353 | 7 | HB |
| Comparative example 4 | 66.7 | 3.3 | 30 | — | 360 | 319 | 338 | 22 | HB |
| Comparative example 5 | 46.7 | 3.3 | 50 | — | 360 | 319 | 330 | 30 | HB |
| Comparative example 6 | 76.7 | 3.3 | 10 | 10 | 360 | 319 | 395 | 65 | HB |
| Comparative example 7 | 56.7 | 3.3 | 30 | 10 | 360 | 319 | 269 | 91 | HB |

TABLE 18

| | PP | MAPP | Pulp | APP | $T_P$ | $T_B$ | $T_{CMP}$ | $T_P - T_{CMP}$ | Class based on UL standard |
|---|---|---|---|---|---|---|---|---|---|
| Example 2 | 36.7 | 3.3 | 50 | 10 | 360 | 315 | 252 | 108 | V-0 |
| Comparative example 8 | 86.7 | 3.3 | 10 | — | 360 | 315 | 351 | 9 | HB |
| Comparative example 9 | 66.7 | 3.3 | 30 | — | 360 | 315 | 320 | 40 | HB |
| Comparative example 10 | 46.7 | 3.3 | 50 | — | 360 | 315 | 252 | 108 | HB |
| Comparative example 11 | 76.7 | 3.3 | 10 | 10 | 360 | 315 | 299 | 61 | HB |
| Comparative example 12 | 56.7 | 3.3 | 30 | 10 | 360 | 315 | 269 | 91 | HB |

TABLE 19

| | PP | MAPP | BF | APP | $T_P$ | $T_B$ | $T_{CMP}$ | $T_P - T_{CMP}$ | Class based on UL standard |
|---|---|---|---|---|---|---|---|---|---|
| Reference example 3 | 36.7 | 3.3 | 50 | 10 | 360 | 310 | 263 | 97 | V-0 |
| Comparative example 13 | 46.7 | 3.3 | 50 | — | 360 | 310 | 373 | −13 | HB |

TABLE 20

| | PLA | CP | APP | $T_P$ | $T_B$ | $T_{CMP}$ | $T_P - T_{CMP}$ | Class based on UL standard |
|---|---|---|---|---|---|---|---|---|
| Example 4 | 60 | 30 | 10 | 350 | 319 | 231 | 119 | V-0 |
| Example 5 | 50 | 40 | 10 | 350 | — | 225 | 125 | V-0 |
| Comparative example 14 | 100 | — | — | 350 | — | — | — | HB |

TABLE 20-continued

| | PLA | CP | APP | $T_P$ | $T_B$ | $T_{CMP}$ | $T_P - T_{CMP}$ | Class based on UL standard |
|---|---|---|---|---|---|---|---|---|
| Comparative example 15 | 90 | — | 10 | 350 | 319 | 339 | 11 | HB |
| Comparative example 16 | 90 | 10 | — | 350 | 319 | 349 | 1 | HB |
| Comparative example 17 | 70 | 30 | — | 350 | 319 | 346 | 4 | HB |
| Comparative example 18 | 60 | 40 | — | 350 | 319 | 344 | 6 | HB |
| Comparative example 19 | 80 | 10 | 10 | 350 | 319 | 257 | 93 | HB |

The values of $T_P - T_{CMP}$ in Examples 1 to 5 Examples 1 and 2, Reference example 3, and Examples 4 and 5 that were rated as V-0, which is the best flame retardancy this time, were 113° C., 108° C., 97° C., 119° C., and 125° C. In other comparative examples rated as HB, which is worst flame retardancy, the maximum value of $T_P - T_{CMP}$ was 93° C. (Comparative example 19).

Each of Examples 1 to 5 that were rated as V-0, satisfies the condition of $T_P > T_B$.

The results demonstrate that in order to achieve V-0 by promoting the dehydration reaction of the cellulosic material, the condition of $T_P > T_B$ is satisfied, and the value of $T_P - T_{CMP}$ needs to be 95° C. or higher.

The fact that the value of $T_P - T_{CMP}$ is larger indicates that the dehydration reaction occurs at a lower temperature. The occurrence of the dehydration reaction at a lower temperature generates larger amounts of "water" and "carbon", resulting in a thicker char layer.

The reason for the Examples 1 to 5 were rated as V-0 is presumably that by promoting the dehydration reaction, the thickness of the char layer reached a certain level or more to maintain the inside of the material at a temperature equal to or lower than a temperature at which the material continues to burn.

With the findings of the above relational expressions, when attempts are made to allow various thermoplastic resins to achieve V-0 by promoting the dehydration reaction of the cellulosic material in the future, the time for trial and error from kneading to combustion testing is not required, and the value of $T_P - T_{CMP}$ is a simple parameter that determines whether V-0 can be achieved.

Additional Experiment: Experiment Using Polyacetal-Based Sample

To further clarify the technical significance of the present invention, an experiment using a polyacetal-based sample was additionally conducted.

<Production of Polyacetal-Based Sample>

Comparative Example 20

A thermoplastic resin, a cellulosic material, and a phosphate-based flame retardant were kneaded to prepare a resin composition.

As the thermoplastic resin, polyacetal (Iupital (F20), hereinafter abbreviated as "POM", available from Mitsubishi Engineering-Plastics Corporation) was used.

As the cellulosic material, BF having a particle size of 50 μm to 150 μm was used.

As the phosphate-based flame retardant, APP was used.

The amounts mixed were as follows: POM, 44% by weight; BF, 36% by weight; and APP, 10% by weight.

The kneading was performed as described below.

POM and BF were melt-kneaded with a unidirectionally rotating twin-screw extruder (ZSK 18, available from Coperion GmbH, screw diameter=18 mm, L/D=40).

Figure 29:
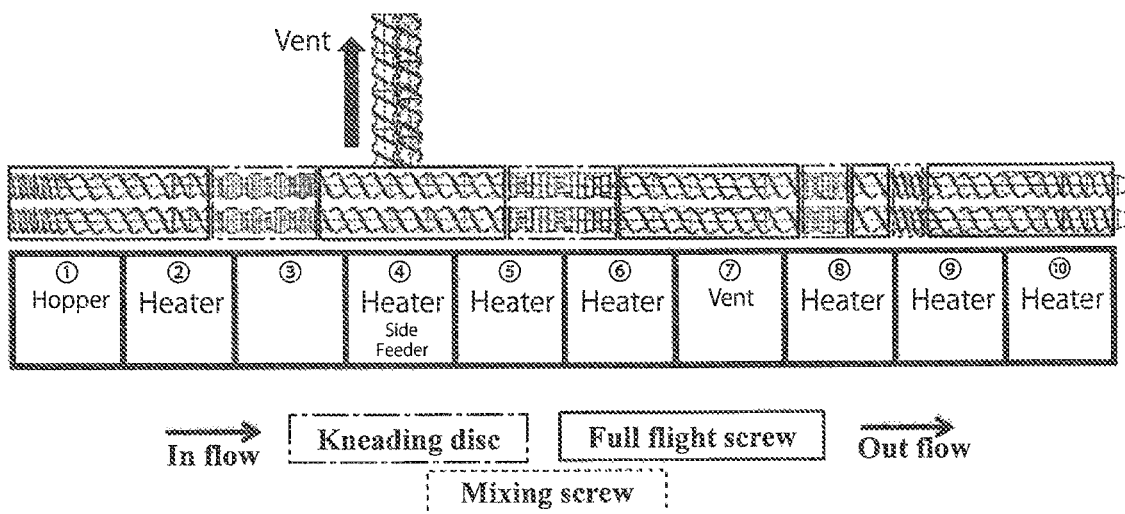
FIG. 29 is a diagram illustrating the configuration of a screw segment used to knead a polyacetal-based sample in an example.

FIG. 29 illustrates the configuration of a screw segment. The screw configuration was such that a shear force was applied to a sample during kneading, as described below. To improve the diffusibility of BF, kneading disks were arranged in two places, and mixing screws were arranged in one place.

Before the kneading, POM and BF were dried with hot air in a hot-air dryer at 80° C. for 24 hours.

Table 21 below presents kneading conditions. The circled numbers correspond to the positional relationship in FIG. 29.

Hereinafter, the resulting pellets are referred to as "POM/BF pellets".

TABLE 21

| | Rotational speed of screw (rpm) | | | | | | |
|---|---|---|---|---|---|---|---|
| | 120 | | | | | | |
| | ② | ④ | ⑤ | ⑥ | ⑧ | ⑨ | ⑩ |
| Set temperature of heater (° C.) | 180 | 180 | 180 | 180 | 180 | 180 | 180 |

Next, APP was added to the POM/BF pellets. The mixture was melt-kneaded with a unidirectionally rotating twin-screw extruder (ZSK18, available from Coperion GmbH, screw diameter=18 mm, L/D=40). The configuration of the screw segment is the same as above, as illustrated in FIG. 29.

Before the kneading, the POM/BF pellets and APP were dried in a hot-air dryer at 80° C. for 24 hours.

Table 22 below presents kneading conditions. The circled numbers correspond to the positional relationship in FIG. 29.

TABLE 22

| | Rotational speed of screw (rpm) 120 | | | | | | |
|---|---|---|---|---|---|---|---|
| | ② | ④ | ⑤ | ⑥ | ⑧ | ⑨ | ⑩ |
| Set temperature of heater (° C.) | 180 | 180 | 175 | 175 | 175 | 165 | 165 |

Comparative Example 21

A thermoplastic resin, a cellulosic material, and a phosphate-based flame retardant were kneaded to prepare a resin composition.

As the thermoplastic resin, POM was used.

As the cellulosic material, BF having a particle size of 50 μm to 150 μm was used.

As the phosphate-based flame retardant, melamine polyphosphate (MPP-A, hereinafter abbreviated as "MPP", available from Sanwa Chemical Co., Ltd).

The amounts mixed were as follows: POM, 44% by weight; BF, 36% by weight; and APP, 10% by weight.

The kneading was performed as described below.

POM/BF pellets were produced as in Comparative example 20.

MPP was added to the POM/BF pellets. The mixture was melt-kneaded with a unidirectionally rotating twin-screw extruder (Thermo Scientific HAAKE Process 11, available from Thermo Fisher Scientific, screw diameter=11 mm, L/D=40).

Figure 30:
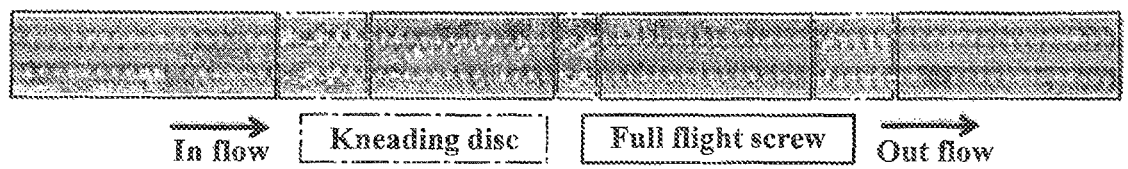
FIG. 30 is a diagram illustrating the configuration of a screw segment used to knead a polyacetal-based sample in an example.

FIG. 30 illustrates the configuration of a screw segment. The screw configuration was such that a shear force was applied to a sample during kneading, as described below. To improve the diffusibility of BF, kneading disks were arranged in three places.

Before the kneading, the POM/BF pellets and MPP were dried with a hot-air dryer at 80° C. for 24 hours.

Kneading conditions were as follows: A screw rotational speed of 150 rpm, and a heater set temperature of 180° C.

Comparative Example 22

A resin composition was prepared as in Comparative example 21, except that as the phosphate-based flame retardant, 7% by weight of APP and 3% by weight of melamine (hereinafter abbreviated as "ME", available from Mitsui Chemicals, Inc.) were used in combination instead of 10% by weight of MPP.

Comparative Example 23

The POM/BF pellets described in Comparative example 20 were used as Comparative example 23.

The amounts mixed were as follows: POM, 60% by weight; and BF, 40% by weight.

<Test>

(Production of Test Piece)

As with the PP-based samples and the PLA-based samples, dumbbell-shaped test pieces, illustrated in FIG. 3, for sample evaluation were produced.

However, the injection molding conditions were as presented in Table 23.

TABLE 23

| | POM base |
|---|---|
| Injection pressure (MPa) | 100 |
| Back pressure (MPa) | 8 |
| Holding Pressure (MPa) | 10 |
| Cylinder temperature (° C.) | 175-190 |
| Mold temperature (° C.) | 60 |
| Screw rotation speed (rpm) | 100 |
| Injection speed (mm/sec) | 50 |
| Holding time (sec) | 10 |
| Cooling time (sec) | 20 |

(Test Method)

Using the test pieces produced above, the same tests as "(1) Burning Test" and "(5) Thermogravimetric Analysis" for the PP-based samples and the PLA-based samples were performed.

(Test Results)

Figure 31:
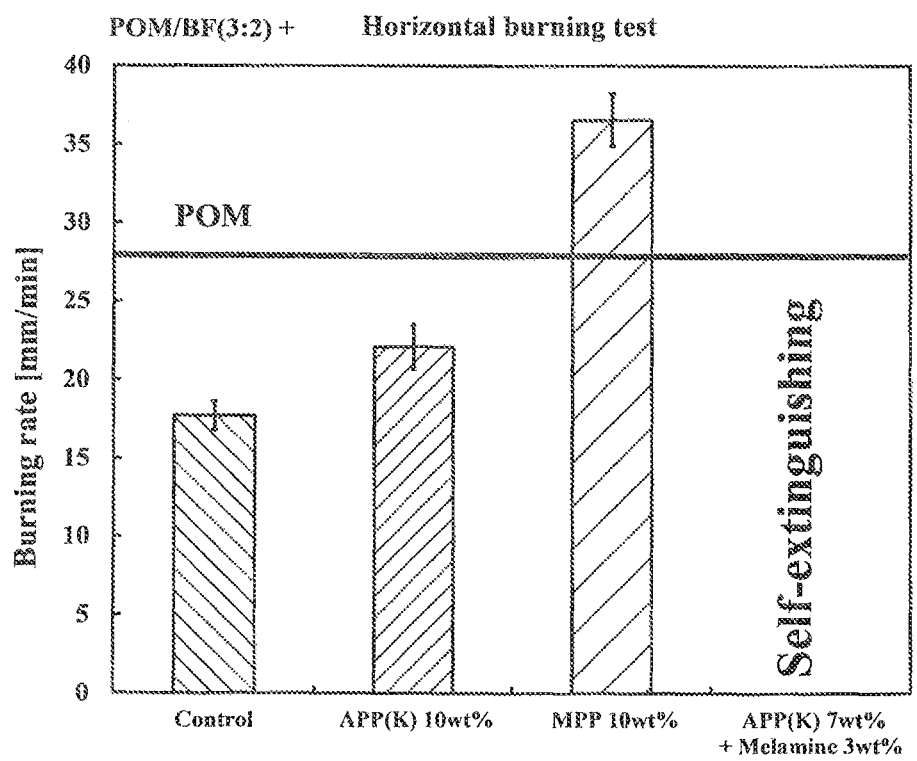
FIG. 31 is a diagram illustrating the resulting burning rates of polyacetal-based samples in examples in a horizontal flame retardancy test.

FIG. 31 illustrates the results of burning rates obtained from the horizontal burning test.

In only Comparative example 22 in which BF, APP, and ME were added, self-extinguishing properties were provided. The self-extinguishing time was 77.66 seconds.

However, in the case where a vertical combustion test was performed on the test piece of Comparative example 22, the test piece was not self-extinguishing when performing the first flame contact.

The results of the thermogravimetric analysis were presented in a table below.

TABLE 24

| | PP | BF | APP | MPP | ME | Ti1 (° C.) Te1 (° C.) | Ti2 (° C.) Te2 (° C.) | Percentage of remaining charred material at 550° C. (%) | $V_{max}1$ (%/min) $V_{max}2$ (%/min) | $T_{max}1$ (° C.) $T_{max}2$ (° C.) |
|---|---|---|---|---|---|---|---|---|---|---|
| Comparative example 20 | 44 | 36 | 10 | — | — | 200 280 | 280 600 | 0.0 | 0.245 0.024 | 220 456 |
| Comparative example 21 | 44 | 36 | — | 10 | — | 220 300 | 300 600 | 0.0 | 0.192 0.019 | 240 453 |
| Comparative example 22 | 44 | 36 | 7 | — | 3 | 220 290 | 290 600 | 0.0 | 0.241 0.021 | 230 465 |
| Comparative example 23 | 60 | 40 | — | — | — | 270 370 | 370 400 | 0.0 | 0.351 — | 340 — |

Figure 32:
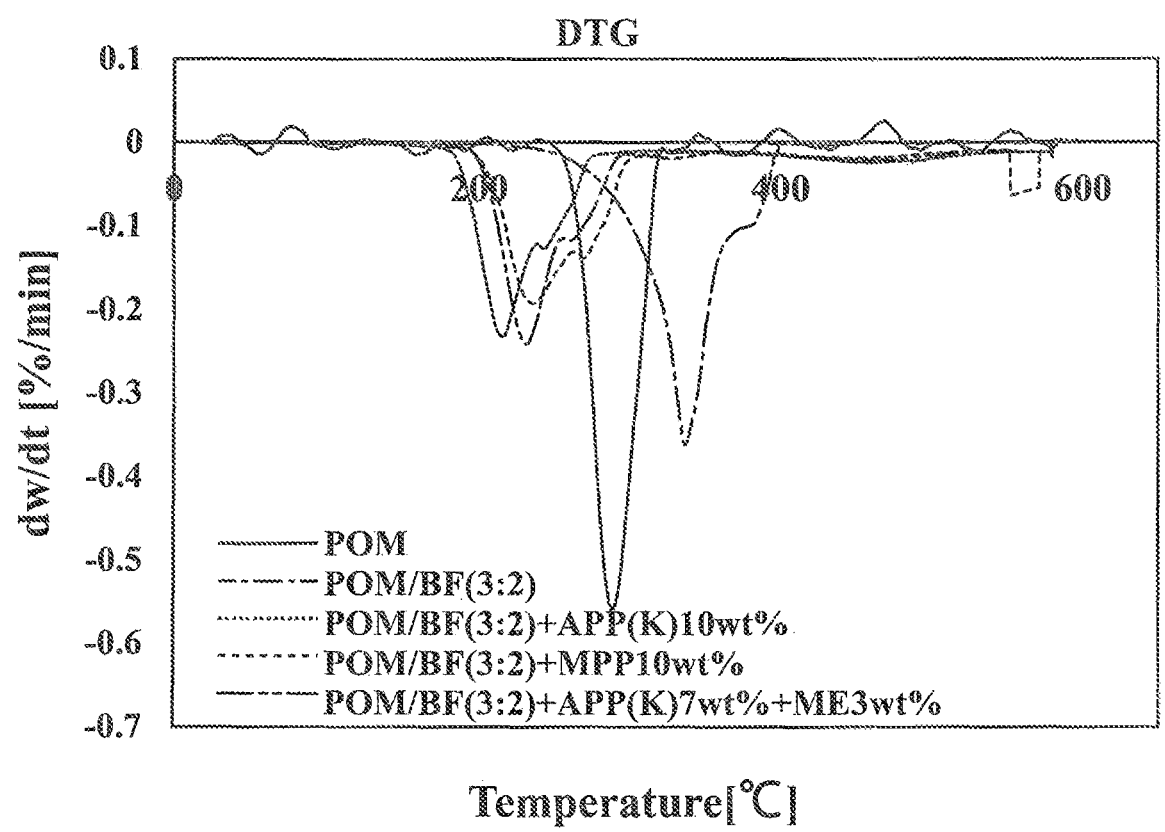
FIG. 32 is a graph illustrating the relationships between the weight loss rate and the temperature of samples in examples.

FIG. 32 illustrates DTG curves in:
Comparative example 20 (POM/BF (3:2)+APP (K) 10 wt %),
Comparative example 21 (POM/BF (3:2)+MPP 10 wt %),
Comparative example 22 (POM/BF (3:2)+APP (K) 7 wt %+ME 3 wt %), and
Comparative example 23 (POM/BF (3:2)).
For reference, data for polyacetal (POM) alone was also depicted.

DISCUSSION

The following table summarizes the values of $T_P$, $T_B$, $T_{CMP}$, $T_P-T_{CMP}$ and the results of flame retardancy in the comparative examples.

TABLE 25

| | PP | BF | APP | MPP | ME | $T_P$ | $T_B$ | $T_{CMP}$ | $T_P - T_{CMP}$ | Class based on UL standard |
|---|---|---|---|---|---|---|---|---|---|---|
| Comparative example 20 | 44 | 36 | 10 | — | — | 290 | 310 | 220 | 70 | HB |
| Comparative example 21 | 44 | 36 | — | 10 | — | 290 | 310 | 240 | 50 | HB |
| Comparative example 22 | 44 | 36 | 7 | — | 3 | 290 | 310 | 230 | 60 | HB |
| Comparative example 23 | 60 | 40 | — | — | — | 290 | 310 | 340 | −50 | HB |

The results of the POM-based samples in the comparative examples also demonstrate that in order to achieve V-0, the condition of $T_P>T_B$ is satisfied and the value of $T_P-T_{CMP}$ needs to be 95° C. or higher.

The invention claimed is:

1. A resin composition comprising a thermoplastic resin, a cellulosic material consisting only of cellulose powder, and a phosphate-based flame retardant, the resin composition satisfying relational expressions (1) and (2) described below:

[Math. 1]
$$T_P-T_{CMP} \geq 95 \quad (1)$$

[Math. 2]
$$T_P > T_B \quad (2)$$

wherein, in expressions (1) and (2), $T_P$, $T_B$, and $T_{CMP}$ are temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition,
wherein, when the resin composition has two weight loss rate peaks, $T_{CMP}$ is a temperature at a peak on a lower temperature side,
wherein the proportion of the flame retardant contained is 5% to 15% by weight per a total amount of the resin composition,
wherein the thermoplastic resin is polyolefin, and
wherein the cellulose powder has a particle size of 150 μm or less.

2. The resin composition according to claim 1, wherein only the phosphate-based flame retardant is contained as a flame retardant.

3. The resin composition according to claim 1, wherein the phosphate-based flame retardant is ammonium polyphosphate and/or melamine phosphate.

4. The resin composition according to claim 1, wherein the proportion of the flame retardant contained is 5% to 10% by weight per a total amount of the resin composition.

5. A resin composition comprising a thermoplastic resin, a cellulosic material consisting only of cellulose, and a phosphate-based flame retardant, the resin composition satisfying relational expressions (1) and (2) described below:

[Math. 1]

$$T_P - T_{CMP} \geq 95 \quad (1)$$

[Math. 2]

$$T_P > T_B \quad (2)$$

wherein, in expressions (1) and (2), $T_P$, $T_B$, and $T_{CMP}$ are temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition, wherein, when the resin composition has two weight loss rate peaks, $T_{CMP}$ is a temperature at a peak on a lower temperature side, wherein the thermoplastic resin is polyester, wherein the proportion of the flame retardant contained is 5% to 15% by weight per a total amount of the resin composition, wherein the proportion of the cellulosic material is more than 30% by weight and less than 70% by weight per a total amount of the resin composition, wherein the proportion of the cellulosic material is three to four times of the proportion of the flame retardant, and wherein the phosphate-based flame retardant is ammonium polyphosphate and/or melamine phosphate.

6. The resin composition according to claim 5, wherein only the phosphate-based flame retardant is contained as a flame retardant.

7. The resin composition according to claim 5, wherein the polyester is poly(lactic acid).

8. The resin composition according to claim 5, wherein the proportion of the flame retardant contained is 5% to 10% by weight per a total amount of the resin composition.

9. The resin composition according to claim 5, wherein the cellulose is cellulose powder having a particle size of 150 μm or less.

10. A resin composition comprising a thermoplastic resin, a cellulosic material consisting only of cellulose powder, and a phosphate-based flame retardant, the resin composition satisfying relational expressions (1) and (2) described below:

[Math. 1]

$$T_P - T_{CMP} \geq 95 \quad (1)$$

[Math. 2]

$$T_P > T_B \quad (2)$$

wherein, in expressions (1) and (2), $T_P$, $T_B$, and $T_{CMP}$ are temperatures at weight loss rate peaks in thermogravimetric analysis, $T_P$ is a temperature (° C.) at a weight loss rate peak of the thermoplastic resin, $T_B$ is a temperature (° C.) at a weight loss rate peak of the cellulosic material, and $T_{CMP}$ is a temperature (° C.) at a weight loss rate peak of the resin composition, wherein, when the resin composition has two weight loss rate peaks, $T_{CMP}$ is a temperature at a peak on a lower temperature side, wherein the proportion of the flame retardant contained is 5% to 15% by weight per a total amount of the resin composition, wherein the proportion of the cellulosic material is more than 40% by weight and less than 70% by weight per a total amount of the resin composition, wherein the proportion of the cellulosic material is three to four times of the proportion of the flame retardant, wherein the phosphate-based flame retardant is ammonium polyphosphate and/or melamine phosphate, and wherein the cellulose powder has a particle size of 150 μm or less.

11. The resin composition according to claim 10, wherein only the phosphate-based flame retardant is contained as a flame retardant.

12. The resin composition according to claim 10, wherein the thermoplastic resin is polyolefin.

13. The resin composition according to claim 10, wherein the thermoplastic resin is polyester.

14. The resin composition according to claim 13, wherein the polyester is poly(lactic acid).

15. The resin composition according to claim 10, wherein the proportion of the flame retardant contained is 5% to 10% by weight per a total amount of the resin composition.

* * * * *